United States Patent
Profit et al.

US010320932B2

(10) Patent No.: US 10,320,932 B2
(45) Date of Patent: Jun. 11, 2019

(54) CONVEYING STATE CHANGES USING CONNECTIONLESS MESSAGING AND A STORE-AND-FORWARD CACHE

(71) Applicant: Qualcomm Connected Experiences, Inc., San Diego, CA (US)

(72) Inventors: Jack Profit, Vashon, WA (US); Gregory Burns, Quilcene, WA (US); Craig Dowell, Bellevue, WA (US)

(73) Assignee: QUALCOMM CONNECTED EXPERIENCES, INC., San Diego, CA (US)

( * ) Notice: Subject to any disclaimer, the term of this patent is extended or adjusted under 35 U.S.C. 154(b) by 19 days.

(21) Appl. No.: 15/486,657

(22) Filed: Apr. 13, 2017

(65) Prior Publication Data

US 2017/0223130 A1 Aug. 3, 2017

Related U.S. Application Data

(63) Continuation of application No. 14/596,036, filed on Jan. 13, 2015, now Pat. No. 9,635,124.

(60) Provisional application No. 61/927,820, filed on Jan. 15, 2014.

(51) Int. Cl.
*H04L 29/08* (2006.01)
*H04L 29/06* (2006.01)

(52) U.S. Cl.
CPC ......... *H04L 67/2842* (2013.01); *H04L 67/16* (2013.01); *H04L 67/2861* (2013.01); *H04L 67/325* (2013.01); *H04L 69/18* (2013.01)

(58) Field of Classification Search
CPC .................. H04N 21/4331; H04M 3/4878
See application file for complete search history.

(56) References Cited

U.S. PATENT DOCUMENTS

| 9,635,124 B2 | 4/2017 | Profit et al. |
| 2002/0031144 A1 | 3/2002 | Barton |
| 2008/0109302 A1 | 5/2008 | Salokannel et al. |
| 2010/0031242 A1 | 2/2010 | Hong et al. |
| 2010/0106833 A1 | 4/2010 | Banerjee et al. |

OTHER PUBLICATIONS

International Search Report and Written Opinion—PCT/US2015/011400—ISA/EPO—May 8, 2015.
Ververidis C.N, et al., "Service discovery for mobile Ad Hoc networks, a survey of issues and techniques", IEEE Communications Surveys, IEEE, New York, NY, US, vol. 10, No. 3, Jul. 1, 2008 (Jul. 1, 2008), pp. 30-45, XP011234560, ISSN, 1553-877X, DOI, DOI, 10.1109/COMST.2008.4625803 p. 34, left-hand column, paragraph 4—p. 36, left-hand column, paragraph 2.

*Primary Examiner* — Esther B. Henderson
(74) *Attorney, Agent, or Firm* — Neugeboren O'Dowd PC

(57) ABSTRACT

The disclosure relates to conveying state changes from an advertising node to one or more discovering nodes, wherein the advertising node may convey the state changes using small efficient low-level broadcast or multicast advertisements to trigger delivering larger structured data in a manner that may be conceptually similar to broadcasting or multicasting but actually delivered using point-to-point or other delivery mechanisms that may be more efficient and reliable. In particular, the advertising node may the convey state changes using broadcast messaging and a store-and-forward cache in a manner that removes bandwidth and/or size constraints that networks impose on multicast/broadcast datagrams while preserving benefits associated therewith.

19 Claims, 21 Drawing Sheets

CONVEYING STATE CHANGES USING CONNECTIONLESS MESSAGING AND A STORE-AND-FORWARD CACHE

CLAIM OF PRIORITY UNDER 35 U.S.C. § 120

The present Application for Patent is a Continuation of patent application Ser. No. 14/596,036 entitled "CONVEYING STATE CHANGES USING CONNECTIONLESS MESSAGING AND A STORE-AND-FORWARD CACHE" filed Jan. 13, 2015, pending, and assigned to the assignee hereof and hereby expressly incorporated by reference herein, which claims priority to Provisional Application No. 61/927,820 entitled "CONVEYING STATE CHANGES USING CONNECTIONLESS MESSAGING AND A STORE-AND-FORWARD CACHE" filed Jan. 15, 2014, and assigned to the assignee hereof and hereby expressly incorporated by reference herein.

TECHNICAL FIELD

Various embodiments described herein generally relate to conveying state changes from an advertising node to one or more discovering nodes using connectionless messaging and a store-and-forward cache.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

Accordingly, in the near future, increasing development in IoT technologies will lead to numerous IoT devices surrounding a user at home, in vehicles, at work, and many other locations. However, despite the fact that IoT capable devices can provide substantial real-time information about the environment surrounding a user (e.g., likes, choices, habits, device conditions and usage patterns, etc.), broadcast and multicast datagrams transmitted over IP and Bluetooth typically have bandwidth and size constraints that may raise difficulties with respect to sharing large amounts of structured data with an unknown set of recipients. These constraints may be especially applicable to Wi-Fi networks because Wi-Fi access points are typically designed to reduce the bit-rate associated with all broadcast and/or multicast traffic to the slowest supported over-the-air bit-rate, which is typically about 1 MB per second. The ability to send data to unknown recipients is key to several important networking use cases, including device and service discovery and notification delivery, wherein the bandwidth and size constraints that many Wi-Fi networks impose on broadcast and/or multicast datagrams may interfere with the ability to share such data among connected devices in an optimal manner.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to one exemplary aspect, an advertising node may use small and efficient low-level broadcast or multicast messages to trigger delivering larger structured data in a manner conceptually similar to broadcasting or multicasting, except that the larger structured data may actually be delivered using point-to-point or other delivery mechanisms that may be more efficient and reliable than conventional broadcasting or multicasting mechanisms. For example, in one embodiment, the advertising node may store all active messages in a cache (regardless of size) until the active messages are cancelled or otherwise expire. Each time that the advertising node adds a new message to the cache, an internal state variable may be incremented and any messages stored in the cache that are associated with the original state variable may be cancelled. In addition, each time that the advertising node increments the internal state variable, the advertising node may determine whether any other nodes successfully requested one or more messages that were cancelled from the cache. As such, if any other nodes previously requested messages up to and/or including the original state variable, a new low-level advertisement may be generated and broadcasted, wherein the new advertisement may indicate the current value associated with the internal state variable. Otherwise, if no other nodes previously requested messages up to and/or including the original state variable value, the low-level advertisement may not be generated (or broadcasted), thereby substantially reducing the multicast traffic that would otherwise occur when the messages are added to and/or replaced in the cache.

According to another exemplary aspect, the advertising node may convey state changes to one or more discovering nodes using broadcast messaging and a store-and-forward cache to share structured data with an unknown set of discovering nodes in a manner that may remove bandwidth and/or size constraints that Wi-Fi, Bluetooth, and other networks typically impose on multicast/broadcast datagrams while still preserving benefits associated with multicast/ broadcast datagrams (e.g., the ability to communicate over a network with a set of discovering nodes that are unknown to the advertising node). For example, in one embodiment, the advertising node may include a store-and-forward cache that stores all active advertisement messages regardless of size until the advertising node cancels the active advertisement messages or the active advertisement messages otherwise expire. Each time that the advertising node adds a new message to the store-and-forward cache, the advertising node may increment an internal state variable and may further cancel any old advertisements in the store-and-forward cache that are associated with the original state variable. In addition, each time that the advertising node increments the state variable, the advertising node may determine whether at least one discovering node has requested advertisement messages up to and including the original state variable and thereby successfully acted on the original advertisements that were cancelled from the store-and-forward cache. As such, in response to determining that one or more discovering nodes previously requested advertisement messages up to the original state variable, the advertising node may generate and broadcast a new low-level advertisement having a payload that indicates the current value associated with the state variable. However, if no discovering nodes have previously requested advertisement messages up to the original state variable value, the advertising node may not generate the low-level advertisement, which may substantially reduce the multicast traffic that would otherwise occur when the advertising node rapidly adds or replaces messages to modify the store-and-forward cache.

According to another exemplary aspect, the discovering nodes may further maintain a mapping that has a key corresponding to a device identifier associated with an advertising node and a local value corresponding to the state variable associated with the store-and-forward cache maintained at the advertising node. As such, each time that a discovering node receives a new low-level advertisement from the advertising node, the discovering node may compare the advertised state variable value with the local state variable value mapped to the advertising node, wherein the discovering node may establish a temporary connection with the advertising node if the advertised state variable value exceeds the state variable value locally mapped to the advertising node. The discovering node may then request that the advertising node send all messages in the store-and-forward having an identifier between the state variable value in the mapping maintained at the discovering node and the advertised state variable value, wherein the temporary connection may be closed after the advertising node has sent all of the messages in the store-and-forward cache that fall within the applicable range. Thereafter, the discovering node may update the state variable value in the locally maintained mapping with the state variable value included in the last advertisement message that the advertising node sent to the discovering node.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
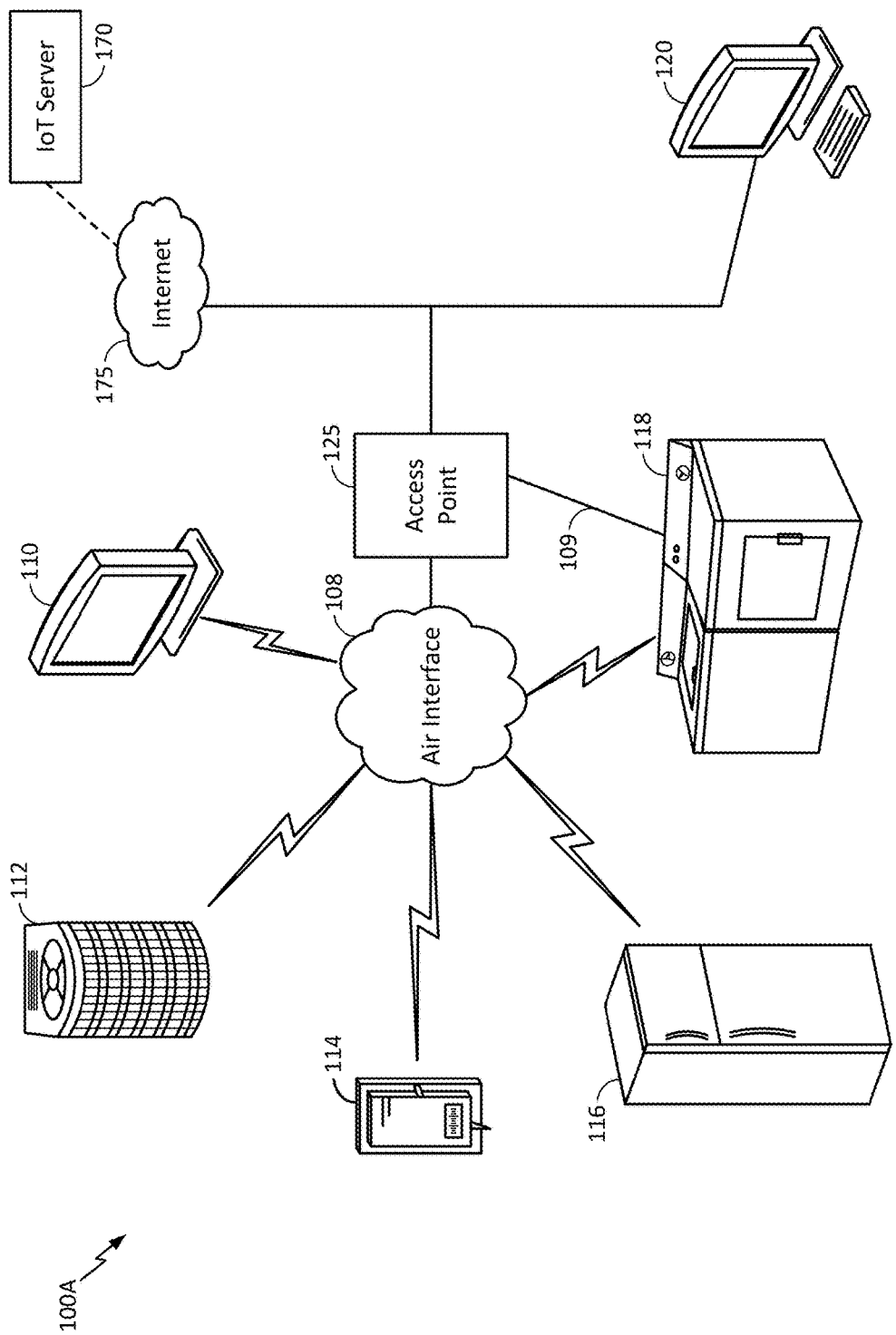
FIG. 1A illustrates a high-level system architecture of a wireless communications system in accordance with an aspect of the disclosure.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and washer and dryer 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with active IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of active IoT devices 110-120 may be a peer-to-peer (P2P) network. In such a case, the active IoT devices 110-120 can communicate with each other directly over the air interface 108 and/or the direct wired connection 109. Alternatively, or additionally, some or all of active IoT devices 110-120 may be configured with a communication interface independent of air interface 108 and direct wired connection 109. For example, if the air interface 108 corresponds to a Wi-Fi interface, one or more of the active IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
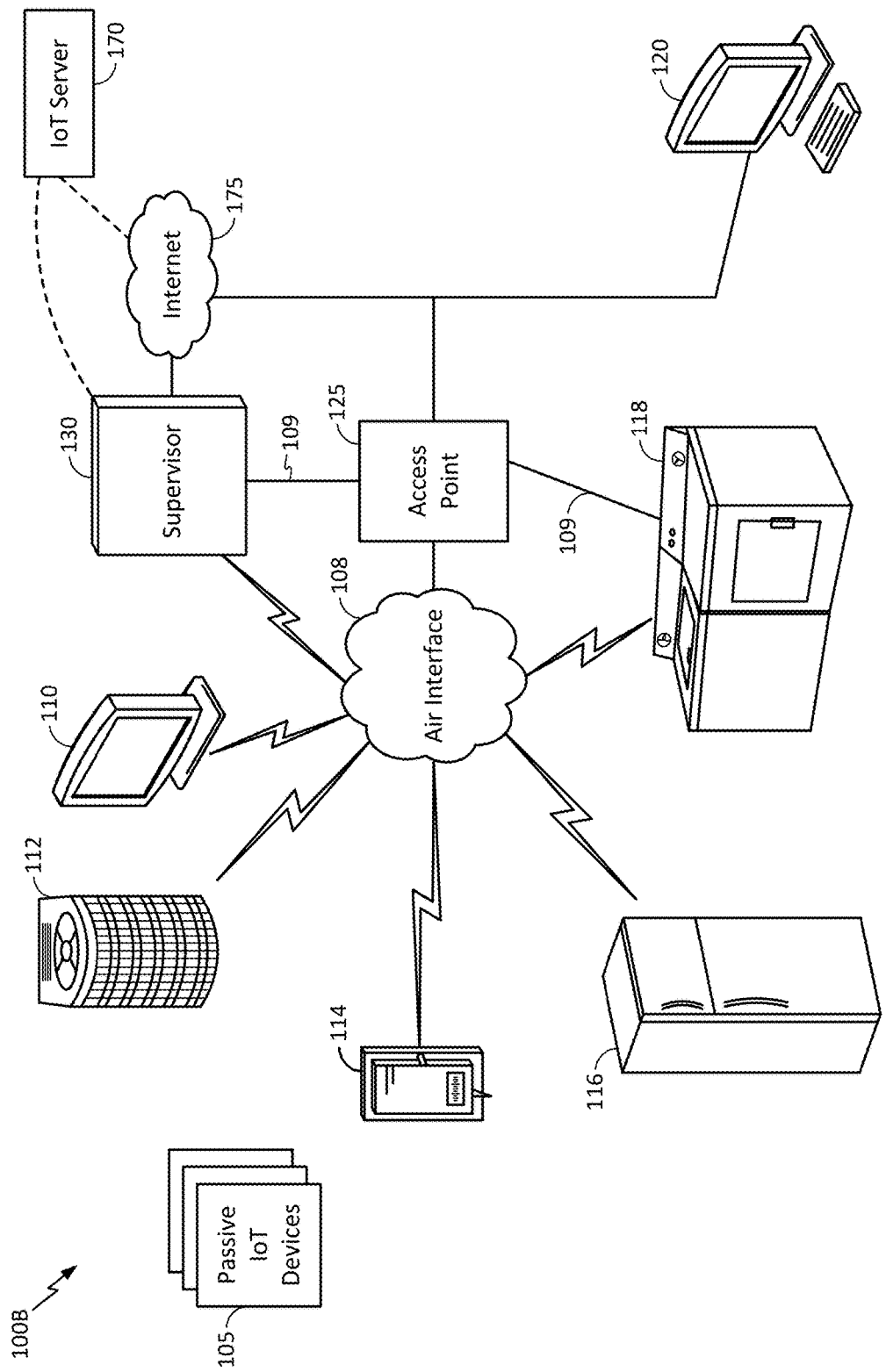
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various active IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various active IoT devices 110-120. The supervisor device 130 may be a standalone device or one of the active IoT devices 110-120, such as computer 120. The supervisor device 130 may be a physical device or a software application running on a physical device. The supervisor device 130 may include a user interface that can output information relating to the monitored attributes, activities, or other states associated with the active IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice have been added or removed. In response to the cabinet IoT device detecting the removal of the coffee cup and the refrigerator IoT device 116 detecting the removal of the container of orange juice, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
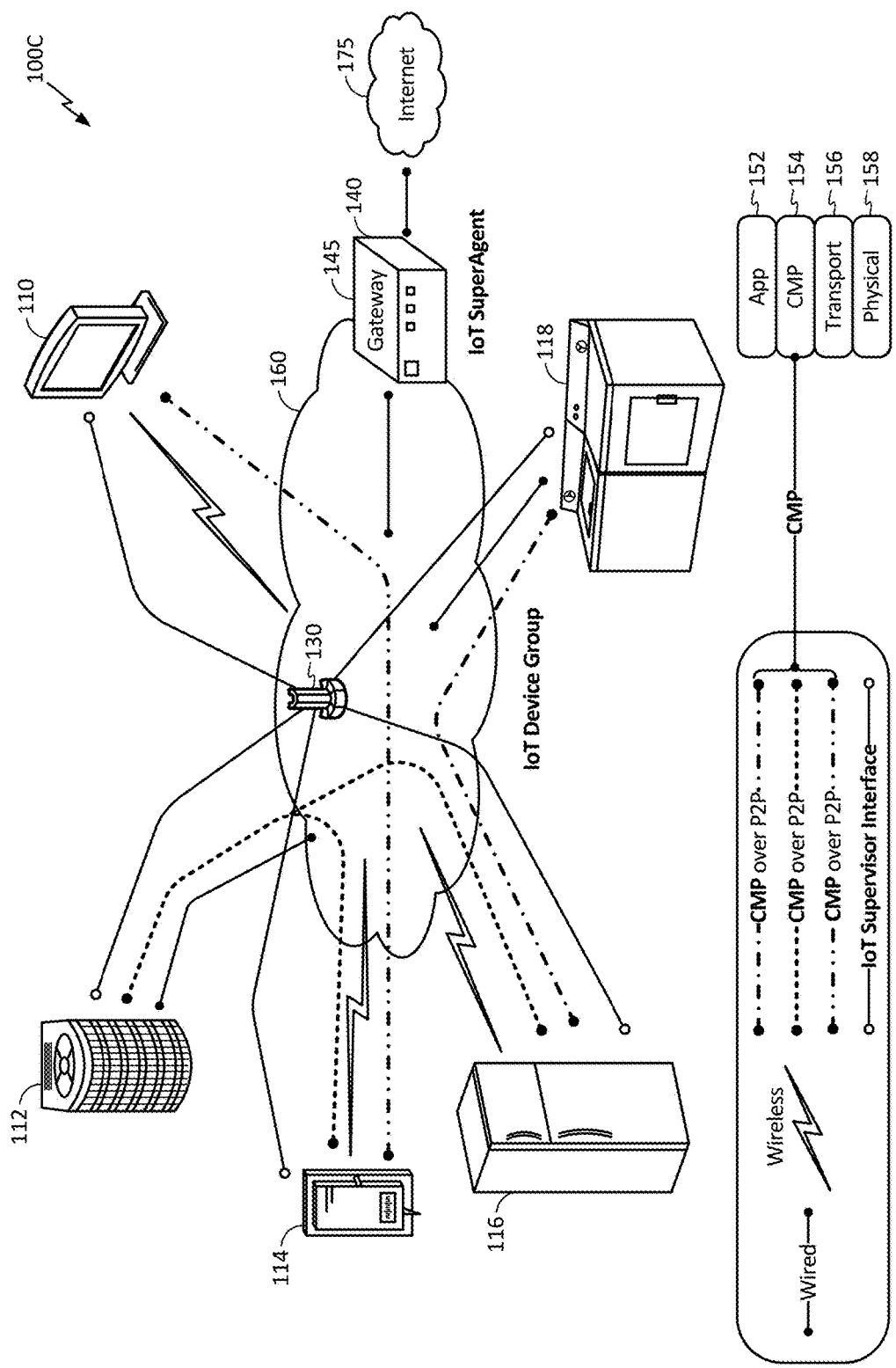
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The wireless communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT device group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
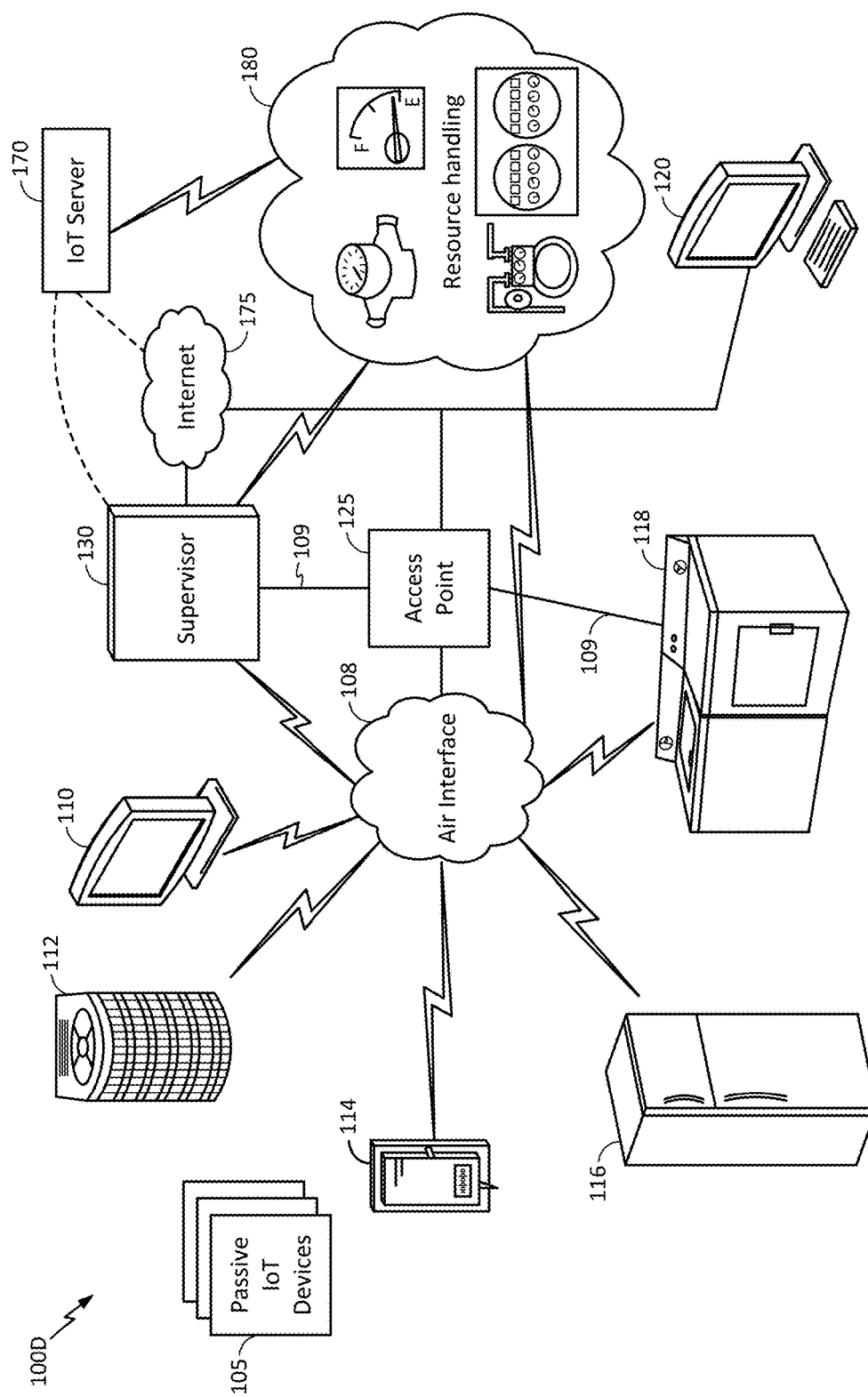
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
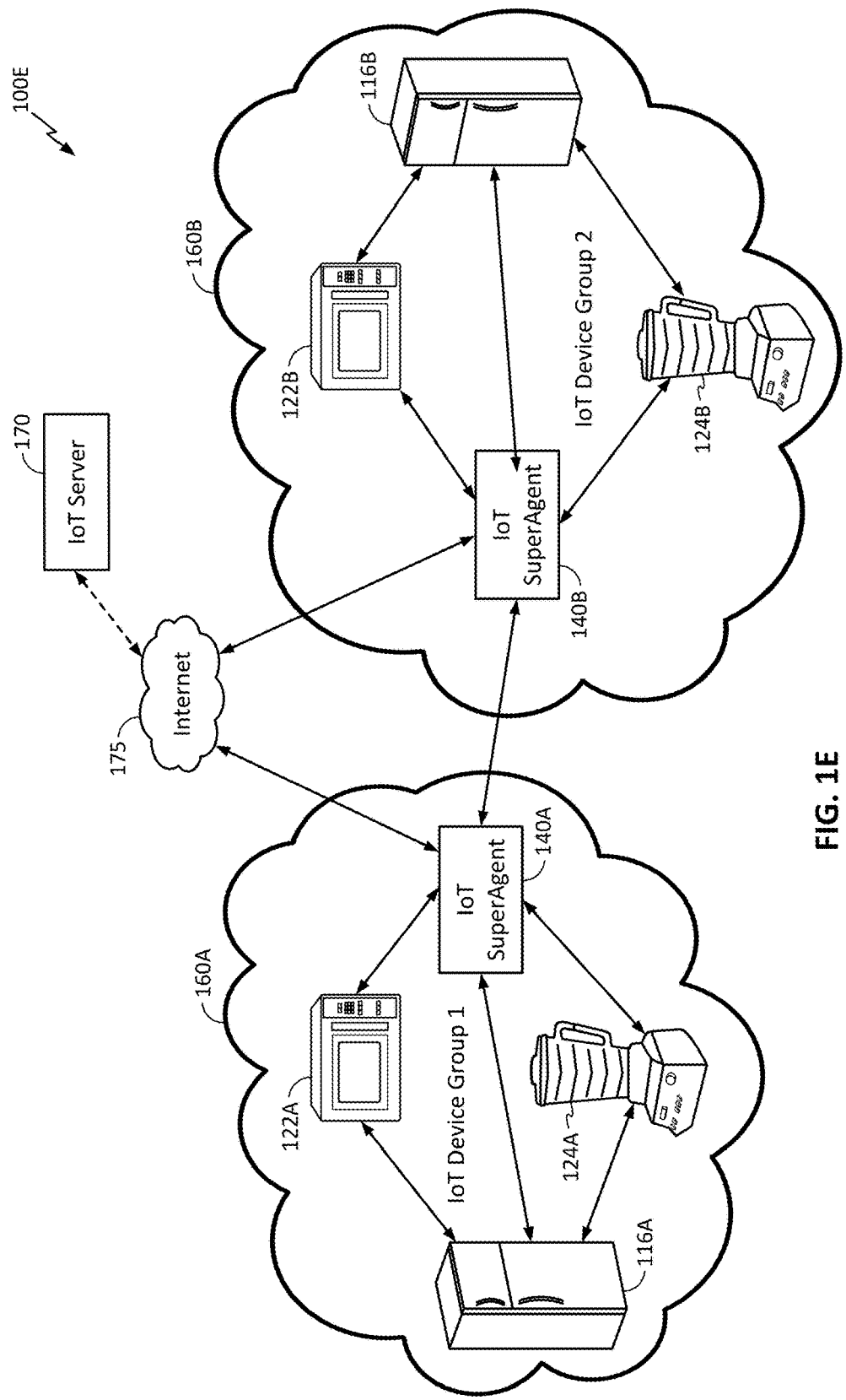
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The wireless communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
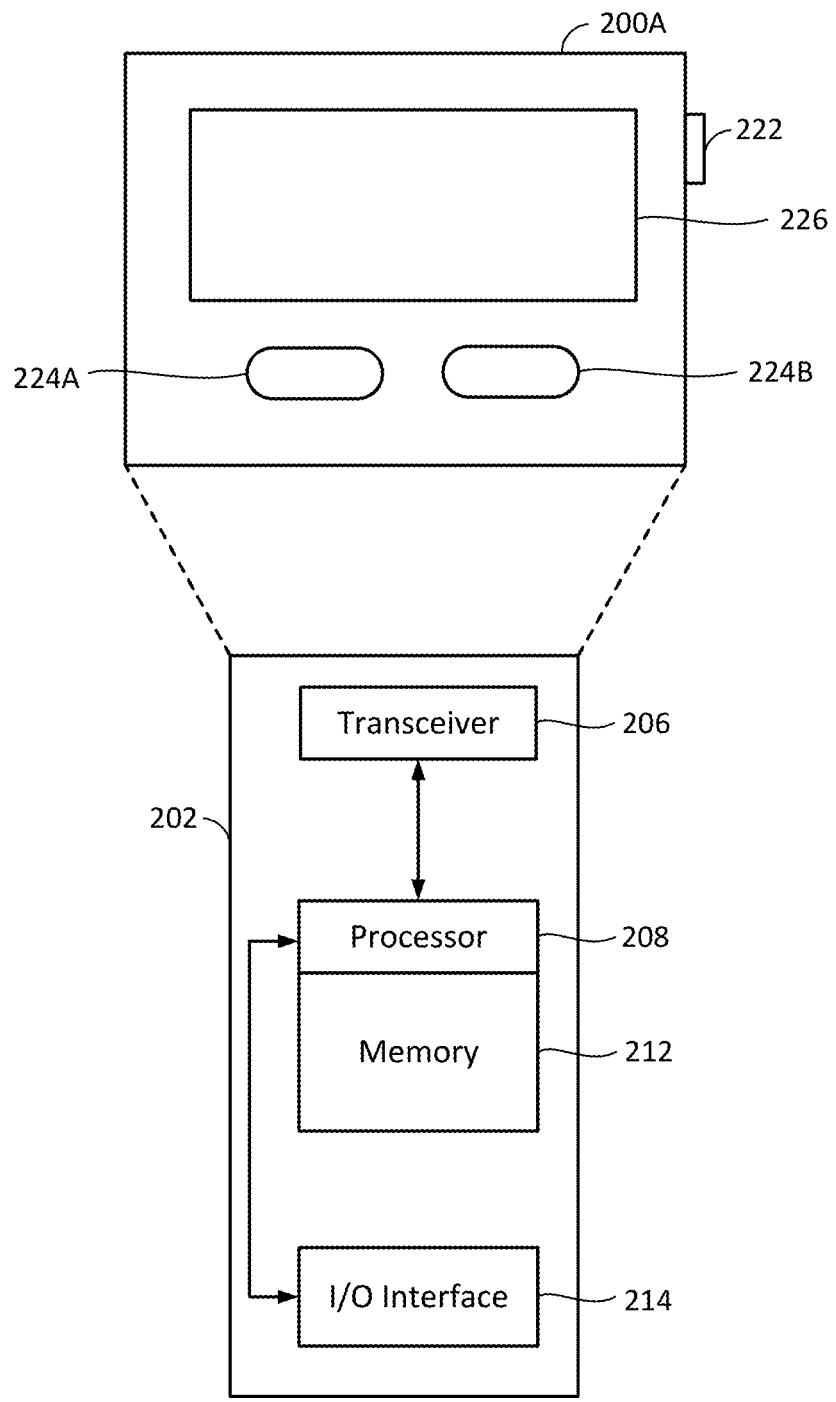

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
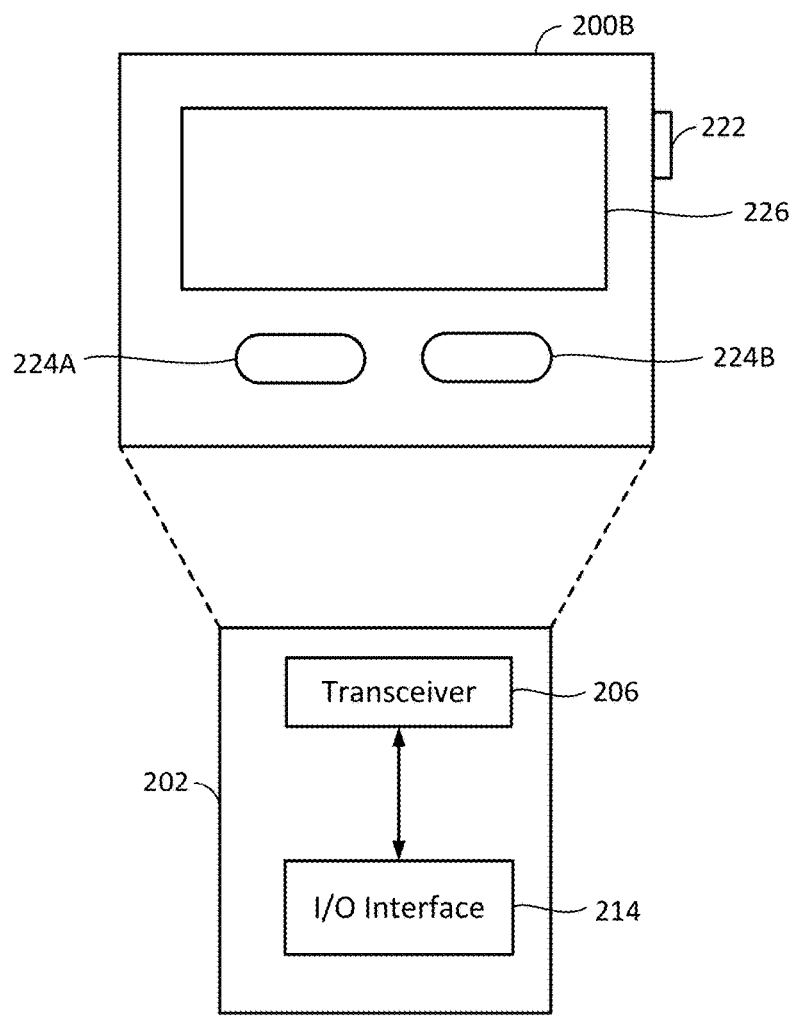
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
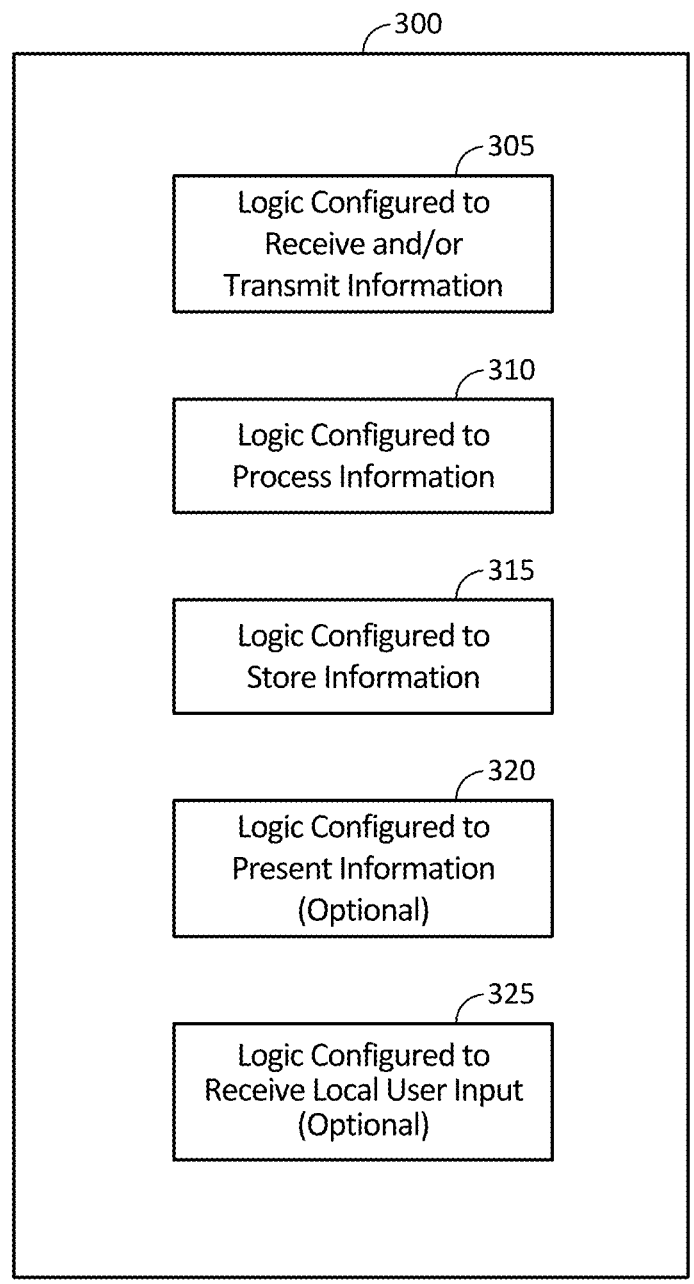
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to active IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server, the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
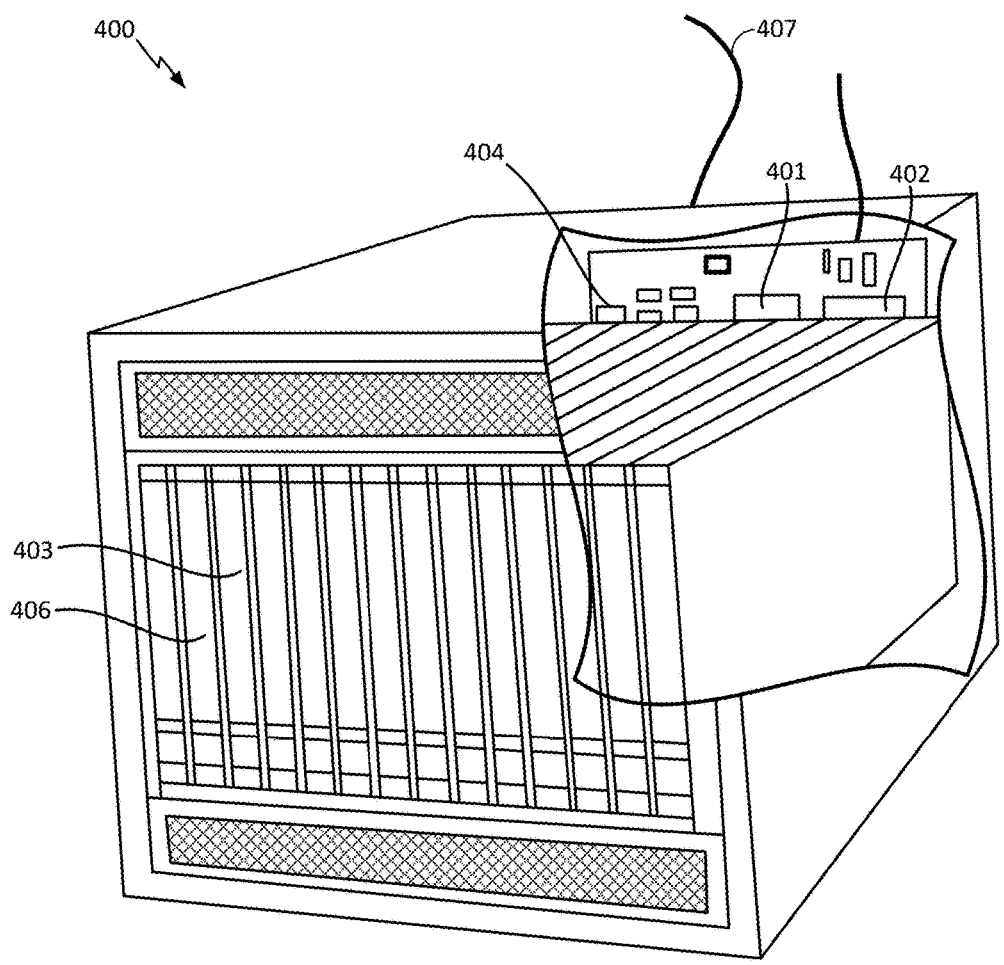
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
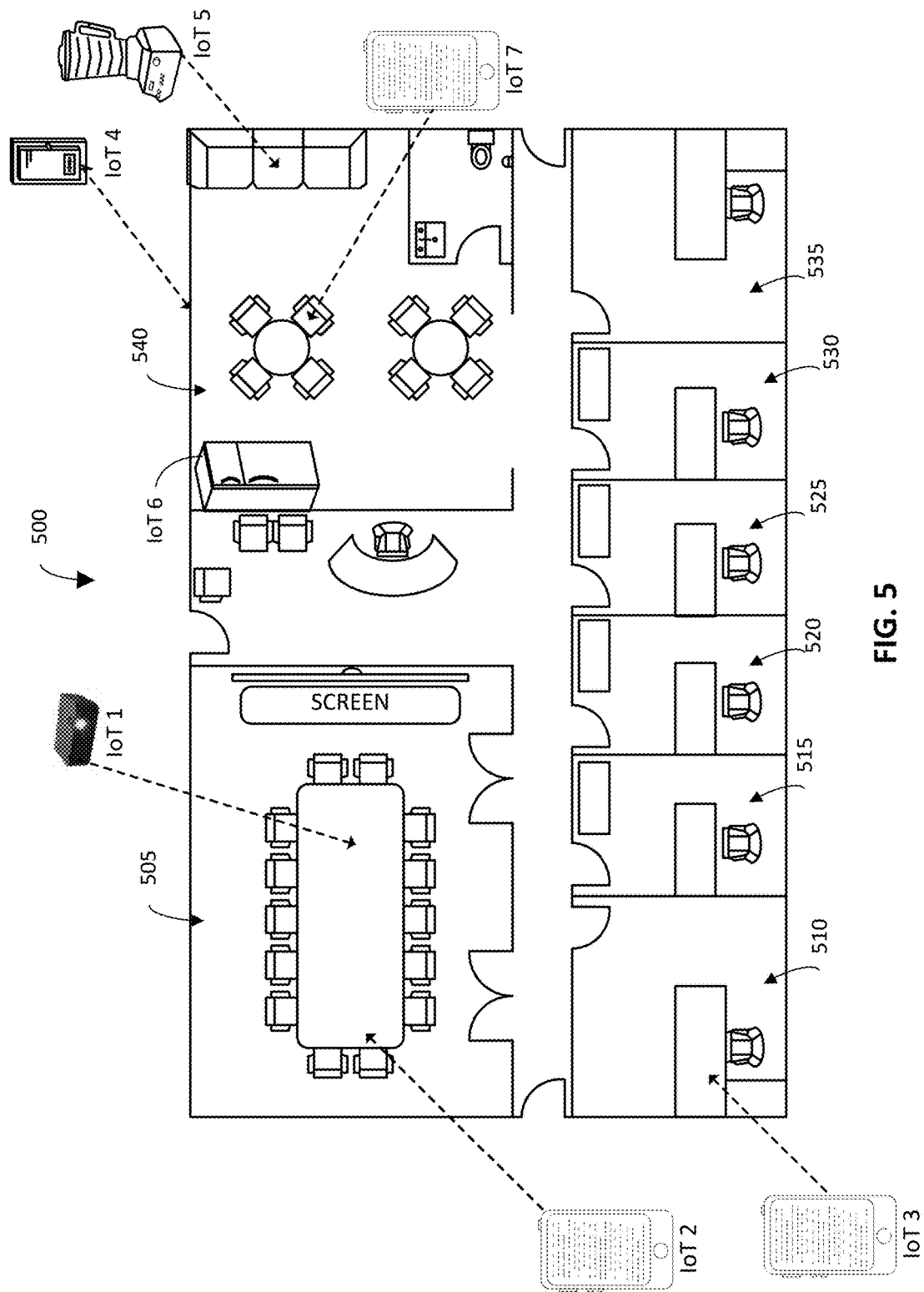
FIG. 5 illustrates an exemplary an Internet of Things (IoT) environment in accordance with an aspect of the disclosure.

FIG. 5 illustrates an exemplary an IoT environment 500 in accordance with an aspect of the disclosure. In FIG. 5, the IoT environment 500 may comprise an office space with a conference room 505, a plurality of offices 510 through 535, and a kitchen 540. Within the office space, IoT device 1 (e.g., a video projector) and IoT device 2 (e.g., a handset device such as a cell phone or tablet computer) are positioned the conference room 505, and IoT device 3 (e.g., a handset device such as a cell phone or tablet computer) is positioned in office 510. Also, IoT device 4 (e.g., a thermostat), IoT device 5 (e.g., a blender), IoT device 6 (e.g., a refrigerator) and IoT device 7 (e.g., a handset device such as a cell phone or tablet computer being operated by an employee on his/her lunch break) are positioned in the kitchen 540. As will be appreciated, while the IoT environment 500 of FIG. 5 is directed to an office, many other configurations of IoT environments are also possible (e.g., residential homes, retail stores, vehicles, stadiums, etc.).

IoT devices are characterized herein as corresponding to either "advertising IoT devices" or "adverting nodes" (e.g., IoT devices that produce data for advertisement or dissemination to other IoT devices) or "discovering IoT devices" or "discovering nodes" (e.g., IoT devices that discover and receive data from an advertising IoT device or advertising node). However, those skilled in the art will appreciate that other suitable terminology may be used. For example, the "advertising IoT devices" or "adverting nodes" may alternatively be referred to as "producer" IoT devices or nodes and the "discovering IoT devices" or "discovering nodes" may alternatively be referred to as "consumer" IoT devices or nodes. Examples of advertising IoT devices include toasters, ovens, washers, dryers, microwaves, etc., and examples of discovering IoT devices include smart phones, tablet computers, televisions, etc. Certain IoT devices can be advertising IoT devices in some contexts and discovering IoT devices in other contacts. For example, a television may be a discovering IoT device when the television receives a notification for presentation thereon (e.g., while watching TV, the TV briefly flashes a "washer has completed wash cycle" notification), and the television may be an advertising IoT device when the television has a notification to report to other IoT devices (e.g., that a particular television program has completed its recording, a score update for a television program being viewed, etc.). Discovering IoT devices are configured with a widget that interprets the data received from advertising IoT devices for output via a control panel in a display of the discovering IoT devices. The control panel interface can permit a user of the discovering IoT devices to perform certain actions, such as dismissing a notification from view (e.g., a "washer has completed wash cycle" notification can appear in the control panel which is dismissed or canceled by the user), or implementing a control function on a remote advertising IoT device (e.g., a "washer has completed wash cycle" notification can appear in the control panel which causes the user to request the washer to transition to a low-heat tumble mode to reduce wrinkles).

Figure 6:
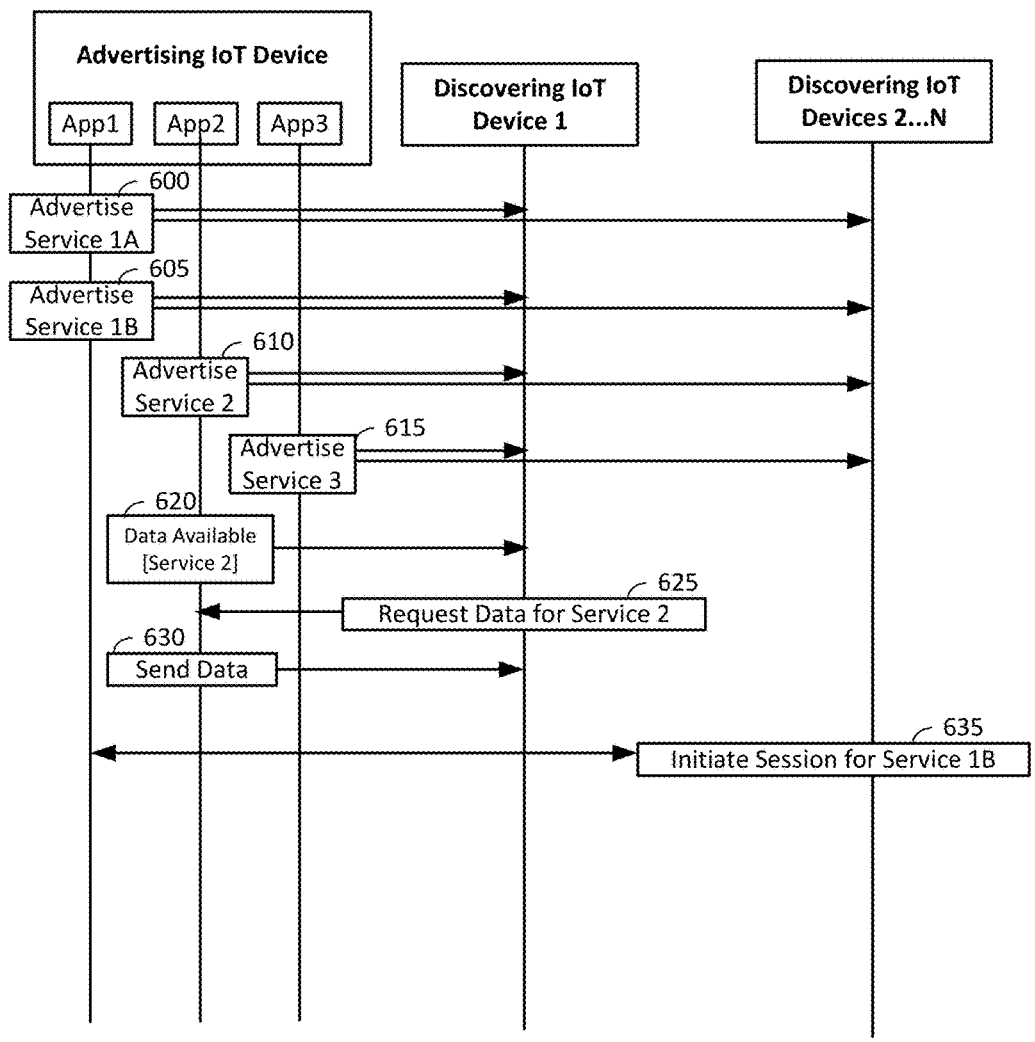
FIG. 6 illustrates a conventional process for advertising services in an IoT environment, such as the IoT environment shown in FIG. 5.

In an IoT environment, advertising and discovery of application-layer services can be implemented using application-initiated multicast/broadcast advertisement messages, as shown in FIG. 6. FIG. 6 illustrates a conventional process for advertising services in an IoT environment such as the IoT environment 500 of FIG. 5.

Referring to FIG. 6, assume that an advertising IoT device is provisioned with Apps 1, 2 and 3, with App1 supporting services 1A and 1B, application 2 supporting service 2 and application 3 supporting service 3. App1 generates and transmits a multicast or broadcast message throughout a local IoT environment (e.g., via Bluetooth, Wi-Fi, LTE, etc.) including discovering IoT devices 1 . . . N that advertises service 1A, 600, and App1 also generates and transmits a multicast or broadcast message throughout the local IoT environment that advertises service 1B, 605. Similarly, App2 generates and transmits a multicast or broadcast message throughout the local IoT environment that advertises service 2, 610, and App3 generates and transmits a multicast or broadcast message throughout the local IoT environment that advertises service 3, 615. The advertisement messages of 600 through 615 each include information such as a service number or ID, connection information for responding to the service advertisements, and so on.

Later, assume App2 has data available for transmission (e.g., a notification that a washer is done with a wash cycle, a notification that a microwave or oven timer has expired, that a water heater is leaking, etc.). Accordingly, App2 generates and transmits a multicast or broadcast message throughout the local IoT environment that indicates data is available for service 2, 620. Discovering IoT device 1 is interested in service 2 and requests the data from App2, 625, and App2 transmits the data via unicast to discovering IoT device 1, 630. Later, one or more of discovering IoT devices 2 . . . N use connection data contained in the advertisement for service 1B from 605 to initiate a session for service 1B with App1 on the advertising IoT device, 635.

As will be appreciated, the approach described in FIG. 6 requires each application to independently generate an advertisement message for advertising its respective service in the IoT environment, and each advertisement message is broadcast to all connected devices in the IoT environment (e.g., via Bluetooth, Wi-Fi, LTE, etc.). This can generate a high amount of multicast traffic in the IoT environment. Also, because multicast and broadcast protocols typically do not require feedback (e.g., ACKs or NACKs), each of the service advertisements of 600 through 615 have relatively low reliability and for this reason are retransmitted at a relatively high frequency, which creates more traffic.

Figure 7:
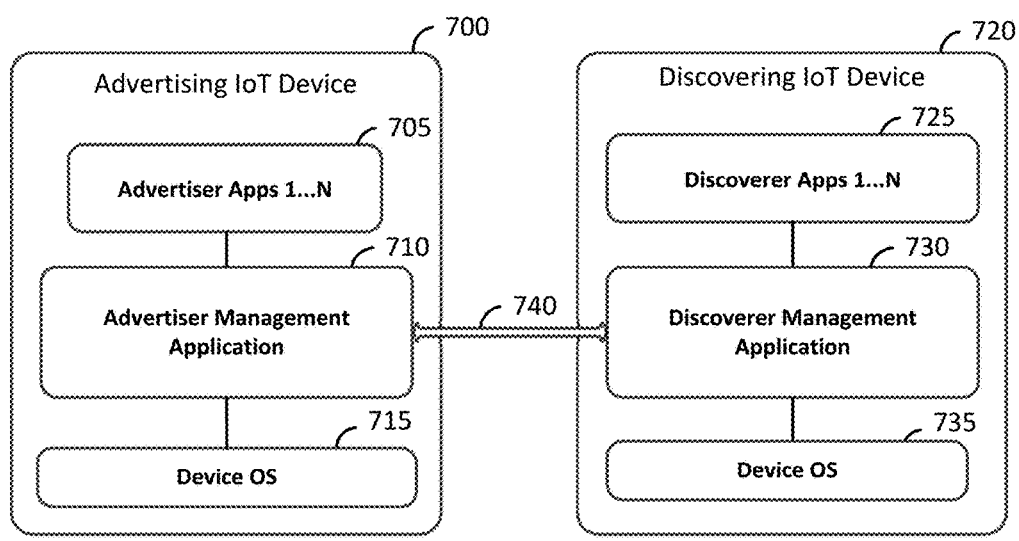
FIG. 7 illustrates an exemplary architecture for a set of IoT devices in accordance with an aspect of the disclosure.

FIG. 7 illustrates software module architecture for a set of IoT devices in accordance with an aspect of the disclosure. Referring to FIG. 7, an advertising IoT device 700 is provisioned with advertiser applications 1 . . . N, 705 (e.g., where N is greater than or equal to 1), an advertiser management application 710 and a device OS 715. A discovering IoT device 720 is provisioned with discoverer applications 1 . . . N, 725 (e.g., where N is greater than or equal to 1), a discoverer management application 730 and a device OS 735. Communication between the advertising IoT device 700 and the discovering IoT device 720 is mediated via an IoT bus 740, which can correspond to a Bluetooth connection, a Wi-Fi connection, an LTE connection, etc. As will be described below, the respective management applications can implement a communication protocol such that a variety of application-layer services can be advertised without the need for each service to independently perform its own advertisement function. Further, it will be appreciated that the IoT bus 740 not only connects advertising IoT devices with discovering IoT devices, but can also be used for advertiser-to-advertiser communication as well as discoverer-to-discoverer communication within the IoT environment. Further, as used herein, "N" is not intended to be a constant value, such that N can be different in different context (e.g., the number of advertiser applications 1 . . . N does not need to be equal to the number of discoverer applications 1 . . . N).

Figure 8:
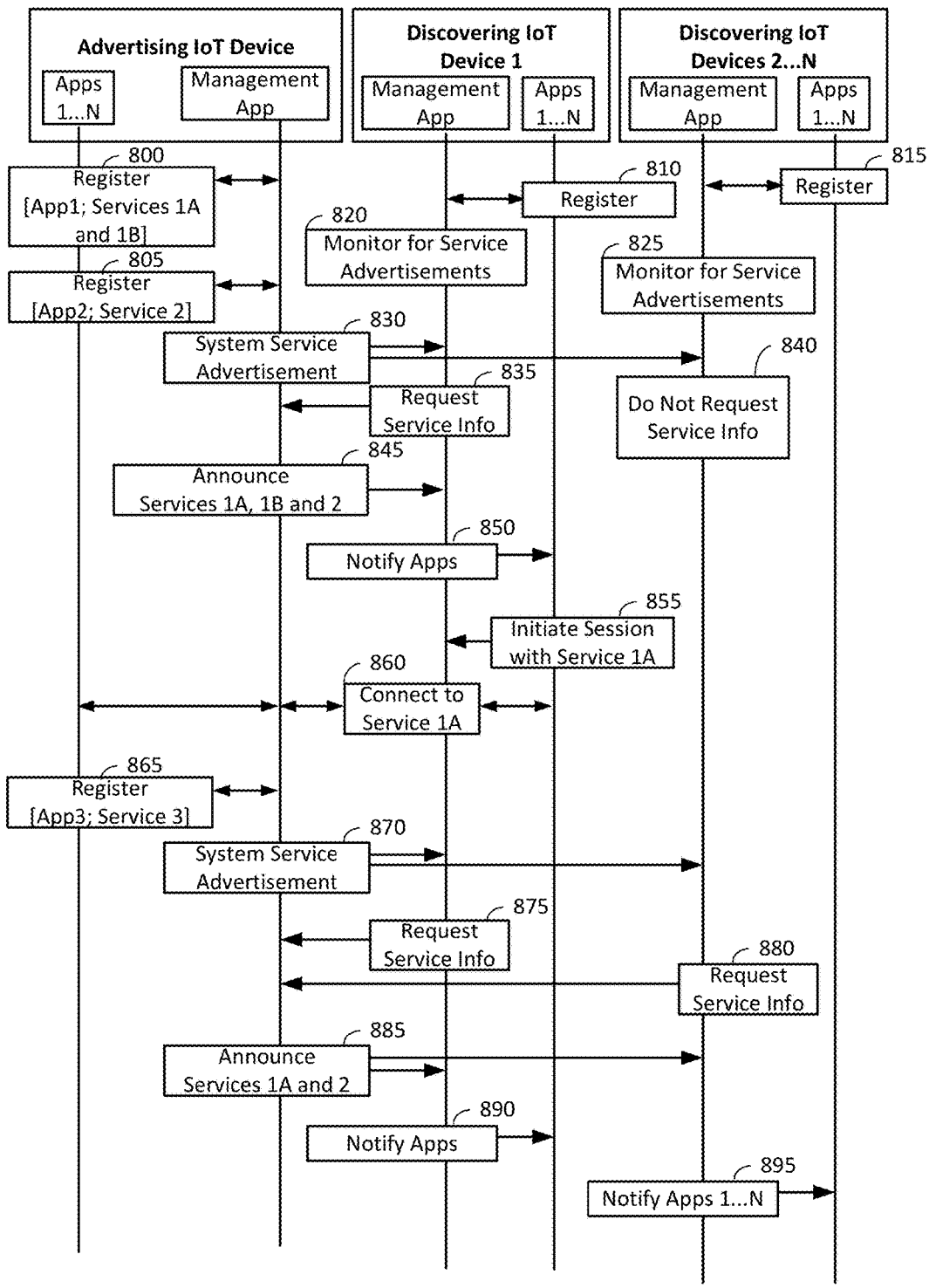
FIG. 8 illustrates an exemplary service advertisement procedure in accordance with an aspect of the disclosure.

FIG. 8 illustrates a service advertisement procedure in accordance with an aspect of the disclosure. Referring to FIG. 8, at the advertising IoT device, App1 registers services 1A and 1B with the advertiser management application, 800, and App2 registers service 2 with the advertiser management application at block 805. As used herein, service registration at the advertising IoT device includes assigning a unique identifier to each registered service, and each unique service identifier for the respective service(s) is added into periodic or event-triggered transmission of a system service advertisement, which will be described below in more detail. Further, at the discovering IoT devices, one or more of Apps 1 . . . N perform a registration function with their respective discoverer management applications (blocks 810 and 815). The registration function of 810 triggers the discoverer management application at discovering IoT device 1 to monitor the IoT bus 740 for system service advertisements, and the registration function of 815 similarly triggers the discoverer management applications at discovering IoT devices 2 . . . N to monitor the IoT bus 740 for system service advertisements, 825.

At 830, the advertiser management application transmits a system service advertisement within the IoT environment that is configured to advertise that one or more services that are currently available and are registered at the advertising IoT device (i.e., services, 1A, 1B and 2). The system service advertisement includes connection information by which any of the discovering IoT devices 1 . . . N can connect back to the advertising IoT device. In an example, the system advertisement message is kept relatively small to reduce the amount of multicast or broadcast overhead in the IoT environment by omitting any service-specific information. Instead, the system advertisement message includes a version number that changes each time the service information changes (e.g., when a service registers or de-registers at the advertising IoT device), and any discovering IoT device that determines itself to be interested in obtaining the service-specific information can fetch this data from the advertising IoT device for separate delivery via unicast. Discovering IoT devices can thereby ignore system advertisement messages with redundant version numbers, while discovering IoT devices can request that the advertising IoT device provide a service announcement message, which includes the service-specific information, if the version number does not equal a current version number for system advertisement messages from the advertising IoT device.

Further, the system service advertisement 830 may be a rich data signal (RDS), which may alternatively be referred to as a connectionless signal. As used herein, an RDS is any signal of a given type where both sender and recipient are not expected to track a history of signal correspondence. For example, a first RDS from a remote control may instruct a television to go "mute," and a second RDS from the remote control may instruct the television to "unmute." Each successive RDS of the given type functions to overwrite any previous RDS of the given type, such that no record needs to be kept by either the sender or the recipient of any old (or lost) RDSs after the overwriting. As an example, an RDS for an IoT notification class can correspond to an "urgent" or "emergency" RDS (e.g., high priority, such as "house is on fire!"), a "warning" RDS (e.g., intermediate priority, such as "humidity in house is currently above threshold" or "hot water heater is leaking") or an "information" RDS (e.g., low priority, such as "dishwasher is nearly done with its cycle"). In another example, each discovering IoT device need only retain the version number of a previous system advertisement message to compare against the version number of later system advertisement messages (i.e., a history of the version number history does not need to be retained, although in theory it could be). In other words, the entire history of RDSs over time does not need to be tracked.

Further, each RDS is associated with a time to live (TTL) whereby the management application that the sender is connected to (e.g., in FIG. 8, the management application on discovering IoT device 1 and the management application(s) on discovering IoT devices 2 . . . N) may keep the RDS in a cache until (i) the TTL expires, or (ii) a newer RDS of the same type becomes available. As such, the management application associated with the sender (e.g., in FIG. 8, the advertising IoT device) may continually retransmit or otherwise readvertise the RDS using low-level advertisements or may simply respond to low-level queries (e.g., multicast queries) from other management applications (e.g., in response to receiving a request for additional service information 835). However, after expiration of an RDS, the RDS will no longer be transmitted even if requested. For example, a coffeemaker completing a pot of coffee may try to ping discovering IoT devices that the coffee is ready for 10 minutes (e.g., TTL=10 minutes), after which the coffeemaker will no longer try to broadcast this information and will not provide a "coffee complete" notification even a discovering IoT device provides a delayed status inquiry to the coffeemaker. RDSs will become more fully understood from a review of the embodiments described below.

Turning back to FIG. 8, discovering IoT devices 1 . . . N each receive the system service advertisement, discovering IoT device 1 requests additional service information, 835 (e.g., based on a version number of the system service advertisement from 830 being different than a current version number maintained at discovering IoT device 1), and discovering IoT devices 2 . . . N do not request additional service information (e.g., based on a version number of the system service advertisement from 830 being the same as a current version number maintained at discovering IoT devices 2 . . . N). The advertising IoT device provides the service announcement for services 1A, 1B and 2 via unicast to discovering IoT device 1 in response to the request from 835, 845. In an example, the service announcement being transmitted via unicast to discovering IoT device 1 at 845 permits the service announcement to be larger (e.g., multicast messages in IoT environments typically have size constraints) and to be transmitted with less network overhead than multicast or broadcast messaging. In a further example, the service announcement is a unicast signal directed to a port number and IP address of discovering IoT device 1. Discovering IoT device 1 delivers the service announcement to its registered Apps, 850. The service announcement includes connection information such as IP address and port number which can be used by one or more of the registered Apps to initiate a session with any of services 1A, 1B and 2 with the advertising IoT device. Accordingly, one of the registered Apps requests that the discoverer management application establish a session with service 1A, 855, after which the session is established with service 1A, 860.

Referring to FIG. 8, at the advertising IoT device, App3 registers service 3 with the advertiser management application, 865. The new registration of service 3 prompts the advertiser management application to transmit a system service advertisement within the IoT environment that is configured to advertise that one or more services that are currently available and are registered at the advertising IoT device (i.e., services, 1A, 1B, 2 and 3). Similar to 845, the system service advertisement of 870 is an RDS and does not actually include any service-specific information. Also, the system service advertisement of 870 includes a different version number than the system service advertisement of 830 to prompt discovering IoT devices to fetch a separate (and large) service announcement for unicast delivery.

Turning back to FIG. 8, discovering IoT devices 1 . . . N each receive the system service advertisement, and discovering IoT devices 1 . . . N each request additional service information, 875 and 880 (e.g., based on a version number of the system service advertisement from 870 being different than a current version number maintained at discovering IoT devices 1 . . . N). The advertising IoT device provides the service announcement for services 1A, 1B 2, and 3 to discovering IoT devices 1 . . . N via separate unicast transmissions in response to the requests from 875 and 880, 885. In an example, unlike the system service advertisement of 870, the service announcement is sent as separate unicast signals directed to port numbers and IP addresses of discovering IoT devices 1 . . . N (e.g., so the service announcement can be larger in size as compared to the multicast system service advertisement). Discovering IoT devices 1 . . . N each deliver the service announcement to their respective registered Apps, 890 and 895.

Figure 9:
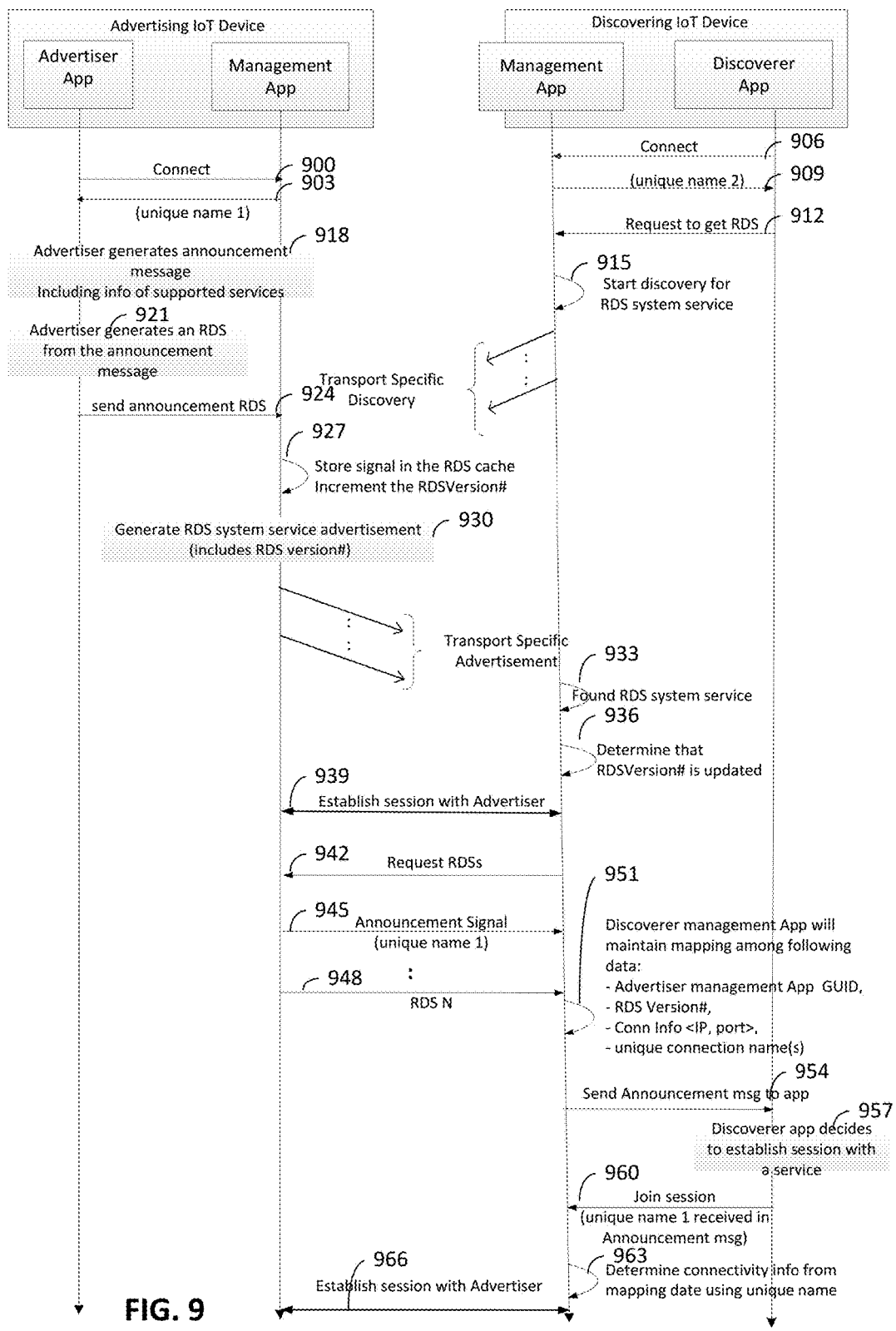
FIG. 9 illustrates a more detailed implementation corresponding to a portion of the exemplary process shown in FIG. 8 in accordance with an aspect of the disclosure.

FIG. 9 illustrates a more detailed implementation example of a portion of the process of FIG. 8 in accordance with an aspect of the disclosure. Referring to FIG. 9, a given advertiser application registers with the advertiser management application by sending a Connect message, 900, and receiving an assignment of a first unique identifier, 903 (e.g., similar to 800 of FIG. 8). A discoverer application at a discovering IoT device also registers with a discoverer management application by sending a Connect message, 906, and receiving an assignment of a second unique identifier, 909 (e.g., similar to 810 or 815 of FIG. 8). The discoverer application requests that the discoverer management application monitor for RDSs, 912, and the discoverer management application begins an RDS system service discovery procedure by monitoring the IoT bus 740 for RDSs, 915 (e.g., similar to 820 and 825 of FIG. 8).

The advertiser application generates a service announcement that includes information pertaining to the advertising IoT device's supported services, 918, and the advertiser application also generates an RDS from the announcement message, 921. The advertiser application provides the RDS to the advertiser management application, 924, and the advertiser management application stores the RDS in a cache, 927. The advertiser management application increments a version number for the system service advertisement and then advertises the system service announcement with the updated version number throughout the IoT environment, 930 (e.g., similar to 830 of FIG. 8). The discovering IoT device detects the system service advertisement, 933, and determines that the version number is updated, 936. The version number update detection at 935 prompts the discovering IoT device to establish a connection with the advertising IoT device using connection information contained in the system service advertisement, 939. Once connected, the discovering IoT device requests any available RDSs, 942 (e.g., similar to 835, 875 or 880 of FIG. 8), and the advertising IoT device transmits the cached RDS (i.e., the service announcement) via unicast to the discovering IoT device, 945 (e.g., similar to 845 or 885 of FIG. 8). The transmission of 945 can continue for a period of time until a TTL of the RDS is expired, 948. In an example, unlike the system service advertisement of 930, the service announcements of 945 and 948 are unicast signals directed to a port number and IP address of the discovering IoT device (e.g., so the service announcement can be larger in size as compared to the multicast system service advertisement due to multicast size constraints that are typical in IoT environments).

Once the discoverer management application obtains the RDS, the discoverer management application updates a mapping table to include a globally unique identifier (GUID) of the advertiser management application and/or the discoverer management application, the most recent RDS version number, connection information (e.g., IP and port number) through which the associated service can be accessed and any unique service identifiers for any advertised service from the RDS, 951. The discoverer management application delivers the service announcement to the discoverer application, 954. At some later point in time, the discoverer application determines to establish a session with one of the advertised services, 957, and thereby delivers a session initiation request to the discoverer management application, 960. The discoverer management application looks up the connection information for the target service from its mapping table, 963, and uses the connection information to establish a session with the advertising IoT device, 966.

In a further embodiment, one or more advertising IoT devices deployed in the IoT environment could be CPU, memory and/or battery limited. These limited advertising IoT devices will most likely not be up and running all the time. Rather, these limited advertising IoT devices may wake up periodically, perform certain functions and go back to sleep. Such devices are referred to herein as "thin client (TC)" advertising IoT devices.

In an embodiment, a TC advertising IoT device only has a lightweight TC manager application running on the device, and the TC advertising IoT device accesses the IoT bus 740 via another advertising IoT device. So, a TC advertising IoT device can essentially offload IoT bus functionality to another IoT device.

At start-up, the TC manager application discovers and connects with an interface to the IoT bus 740 that is running on another IoT device. From that point onwards, the TC manager application uses that other IoT device's interface to the IoT bus 740 for accomplishing IoT functionality including service advertisement/discovery, session establishment with remote service, signal delivery, etc. If the TC management application is not able to connect to a previously discovered IoT bus interface, it attempts to discover another IoT bus interface for setting up the connection. The TC management application can use the same set of over-the-wire protocols as a standard non-TC (or standard) management application. This ensures compatibility between thin client and standard IoT devices. Essentially, a remote application communicating with the TC management application will not know that it is talking to a performance-constrained client. However, in an embodiment, there are some message size constraints which apply for a TC advertising IoT device based on available RAM size.

In a further embodiment, a TC advertising IoT device can generate an announcement message and send it to the connected IoT bus interface for transmission throughout the IoT environment via RDS. The TC advertising IoT device can then go back to sleep. The announcement message will then be delivered over RDS by the IoT bus interface at the other IoT device while the TC advertising IoT device is asleep. This announcement message will contain connection information for that IoT bus interface, and the IoT bus interface can in turn add additional information in the announcement message to indicate connectivity information back to the original advertiser app on the TC advertising IoT device. Thus, the IoT bus interface on the other "standard" IoT device acts as a proxy IoT bus for the TC advertising IoT device.

Figure 10:
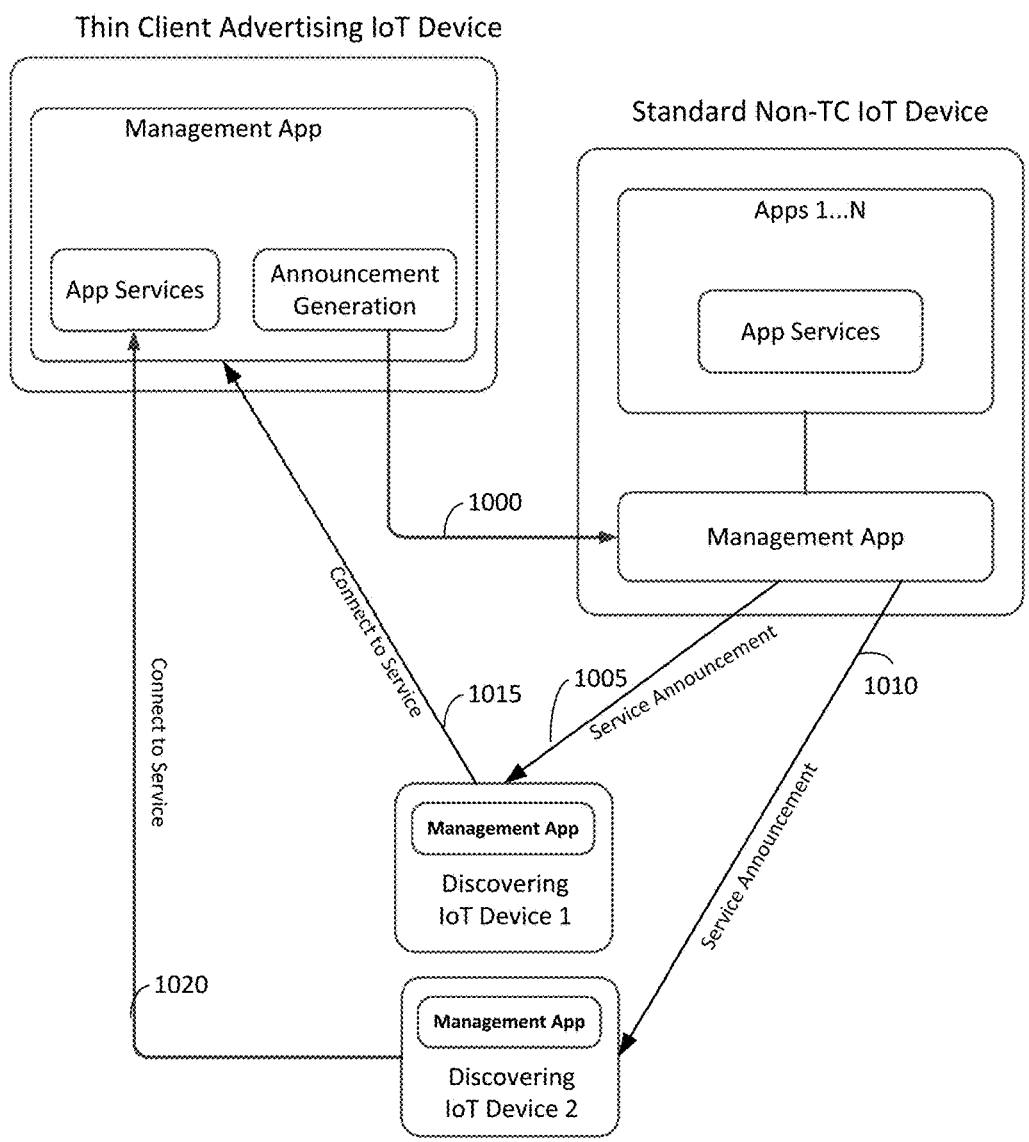
FIG. 10 illustrates an exemplary Thin Client (TC) IoT architecture in accordance with an aspect of the disclosure.

FIG. 10 illustrates an exemplary TC IoT architecture in accordance with an aspect of the disclosure. As described above, the TC advertising IoT device can send service announcements to a standard or non-TC IoT device via connection 1000, and the standard IoT device can in turn have its management application transmit service announcements on its behalf, 1005 and 1010. Discovering IoT devices 1 and 2 receive the service announcement from the standard IoT device, but any requests to instantiate a service session are thereafter delivered directly to the TC IoT device, 1015 and 1020. Accordingly, it will be appreciated that all of the embodiments described in this Specification can be implemented whereby the advertising IoT device is either a standard advertising IoT device or a TC advertising IoT device.

While the examples provided above primarily relate to RDS distribution related to service discovery (e.g., the system service advertisement and service announcement messages), other embodiments are directed to using the RDS protocol for delivery of time-sensitive event notifications (e.g., the coffeemaker may want to tell the user that the coffee is done, the washer may want to tell the user that the wash cycle is done, the television may detect a recording conflict, etc.). A high-level notification delivery procedure is described below with respect to FIG. 11.

Figure 11:
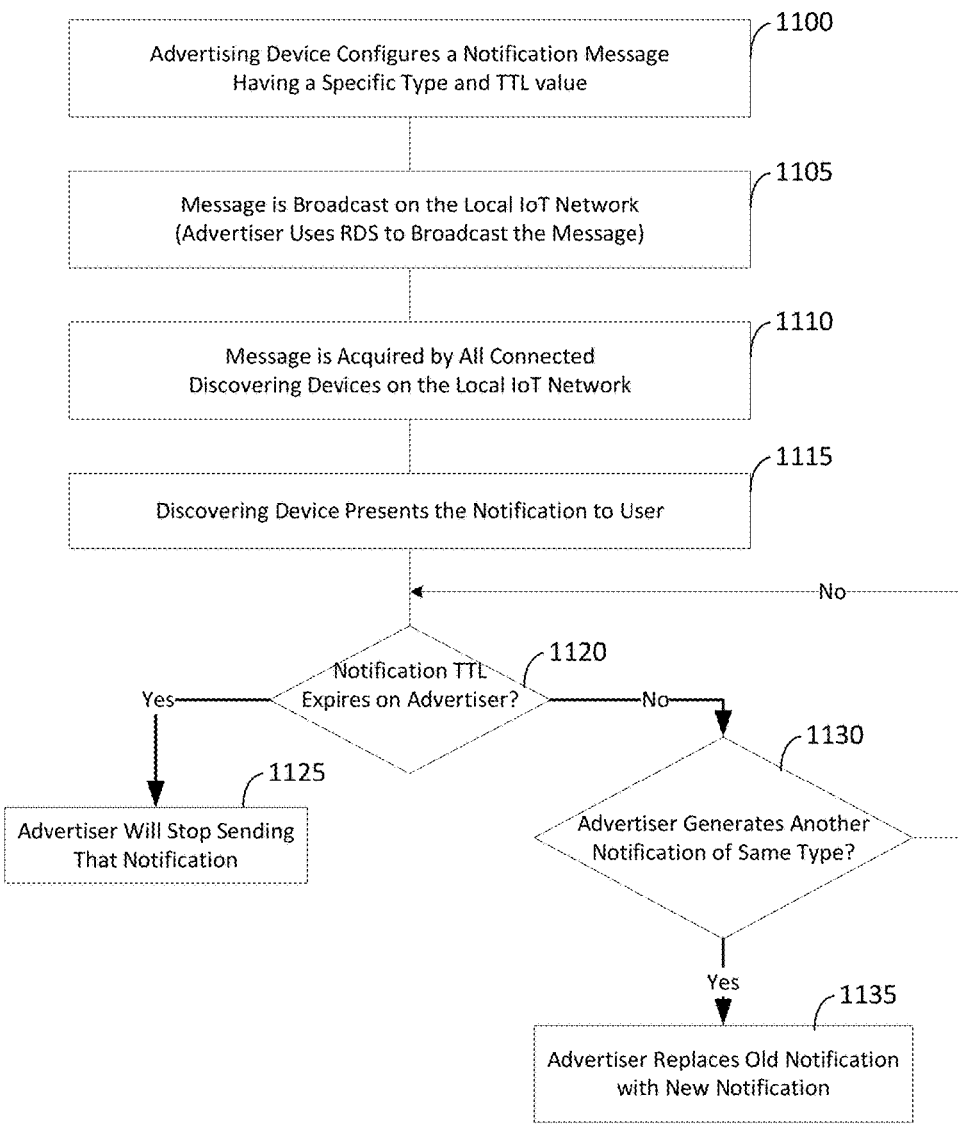
FIG. 11 illustrates an exemplary high-level notification delivery procedure in accordance with an aspect of the disclosure.

Referring to FIG. 11, an advertising IoT device configures a notification message with a particular message type (e.g., emergency, warning or information) and with a particular TTL, 1100. The advertising IoT device multicasts or broadcasts a notification advertisement for the notification message throughout the local IoT environment, 1105. The notification message includes a unique version number that is configured to overwrite a previous notification message of the same type from that particular advertising IoT device (but not notification messages of different types). The notification message is fetched by the discovering IoT devices in the local IoT environment via unicast RDS, 1110. The discovering IoT devices present the notification to their respective users, 1115. Table 1 (below) shows an exemplary set of fields that can be made part of the notification message:

TABLE 1

| | Exemplary Notification Message Fields |
|---|---|
| Field Name | Description |
| msgType | The msgType field defines the types of the notification message.<br>0-Emergency<br>1-Warning<br>2-Information |
| TTL | The TTL field specifies the validity period for the notification message in number of seconds. It has a [min, max] range defined. |

TABLE 1-continued

Exemplary Notification Message Fields

| Field Name | Description |
| --- | --- |
| langText | The langText specifies language specific notification text |
| richAudioUrl | The richAudioUrl specifies the language specific URL for rich notification audio content. |
| richIconUrl | The richIconUrl specifies the URL for rich notification icon content. |
| customAttributes | The customAttributes field defines a set of attribute and value pair. This can be used by the OEMs to add OEM specific fields to the notification message. |
| respObjectPath | The respObjectPath specifies an object path which can be used for interacting back with the advertising IoT device (e.g., this can be Control Panel Service object path). |

During the notification delivery procedure of FIG. 11, the advertising IoT device runs a timer that is compared against the TTL. If advertising IoT device determines that the TTL is expired at 1120, the advertising IoT device will stop multicasting the notification advertisement in the local IoT environment and will also stop delivering the notification message itself if requested to do so, 1125. Otherwise, while the TTL is not yet expired, the advertising IoT device determines whether another notification message of the same type is to be transmitted, 1130. If not, the process returns to 1120 and the timer continues to run. If so, the advertising IoT device replaces the old notification message with the new notification message, updates the TTL for the new notification message and the process returns to 1100 for the new notification message whereby the notification advertisement continues to be multicast with a new version number.

Figure 12:
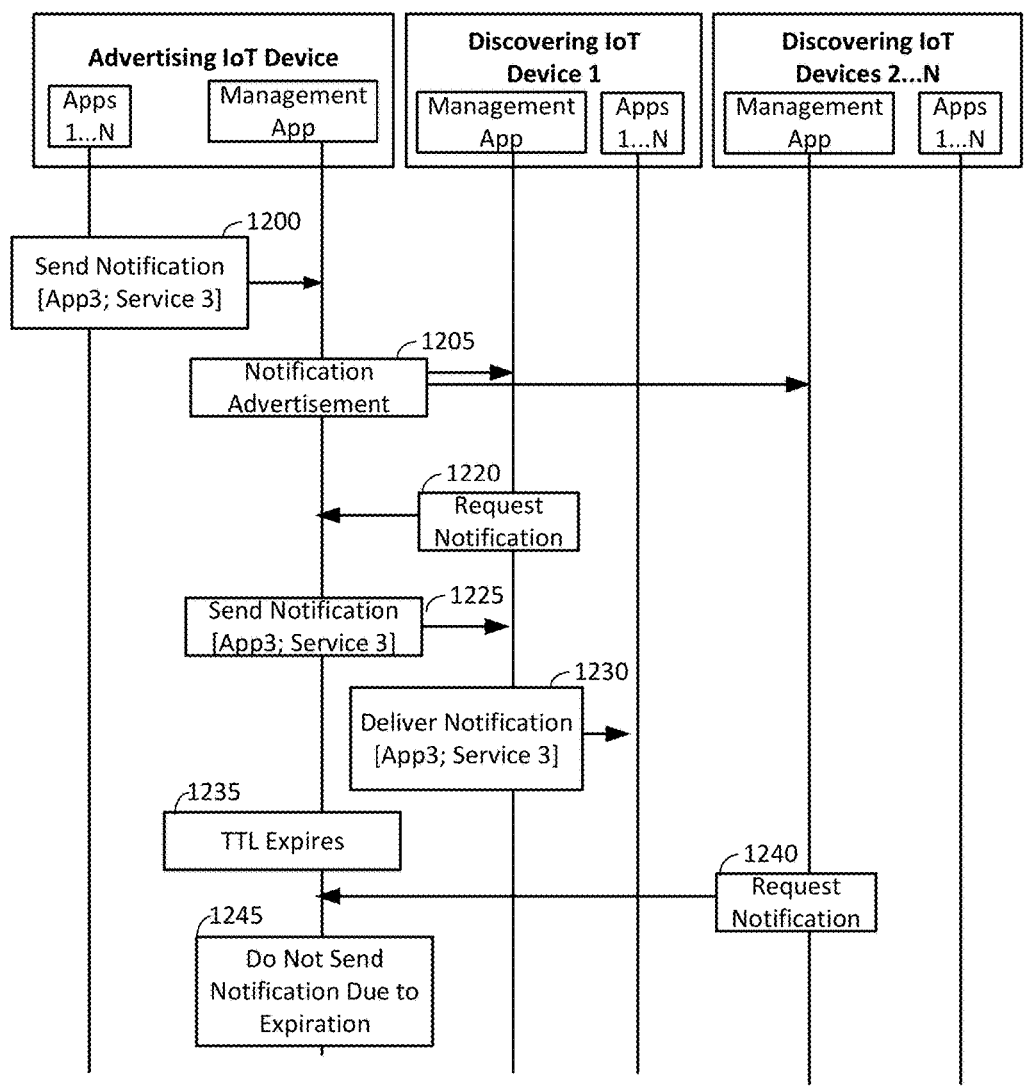
FIG. 12 illustrates an exemplary implementation of the process shown in FIG. 11 in accordance with an aspect of the disclosure.

FIG. 12 illustrates one example implementation of the process of FIG. 11 in accordance with an aspect of the disclosure. In FIG. 12, assume that the process of FIG. 8 has already executed and that services 1A, 1B, 2 and 3 for the advertising IoT device have been advertised to discovering IoT devices 1 . . . N. At some later point in time, assume that App3 determines to send a notification for service 3, 1200. The advertiser management application begins to multicast or broadcast a notification advertisement via RDS in the IoT environment that indicates that one or more notifications are available from the advertising IoT device 1205. Similar to the system service advertisement, the notification advertisement is kept relatively small and does not include the actual notification message, but rather includes a version number so that discovering IoT devices are prompted to query for the notification(s) if the version number is different from a version number of a previously received notification advertisement from the advertising IoT device. The discoverer management application at discovering IoT device 1 receives the notification advertisement and requests the notification message, 1220. The advertiser management application then provides the notification message to discovering IoT device 1 via unicast RDS, 1225, and the discoverer management application at discovering IoT device 1 in turn delivers the notification to one of Apps 1 . . . N for presentation, 1230.

At some later point in time, assume that the TTL for the notification message expires. After the expiration, the discoverer management application at one of discovering IoT devices 2 . . . N decides to respond to the notification advertisement and requests the notification, 1240. However, because the TTL for the notification message is expired, the advertiser management application does not provide the notification message to the requesting discovering IoT device, 1245.

Figure 13:
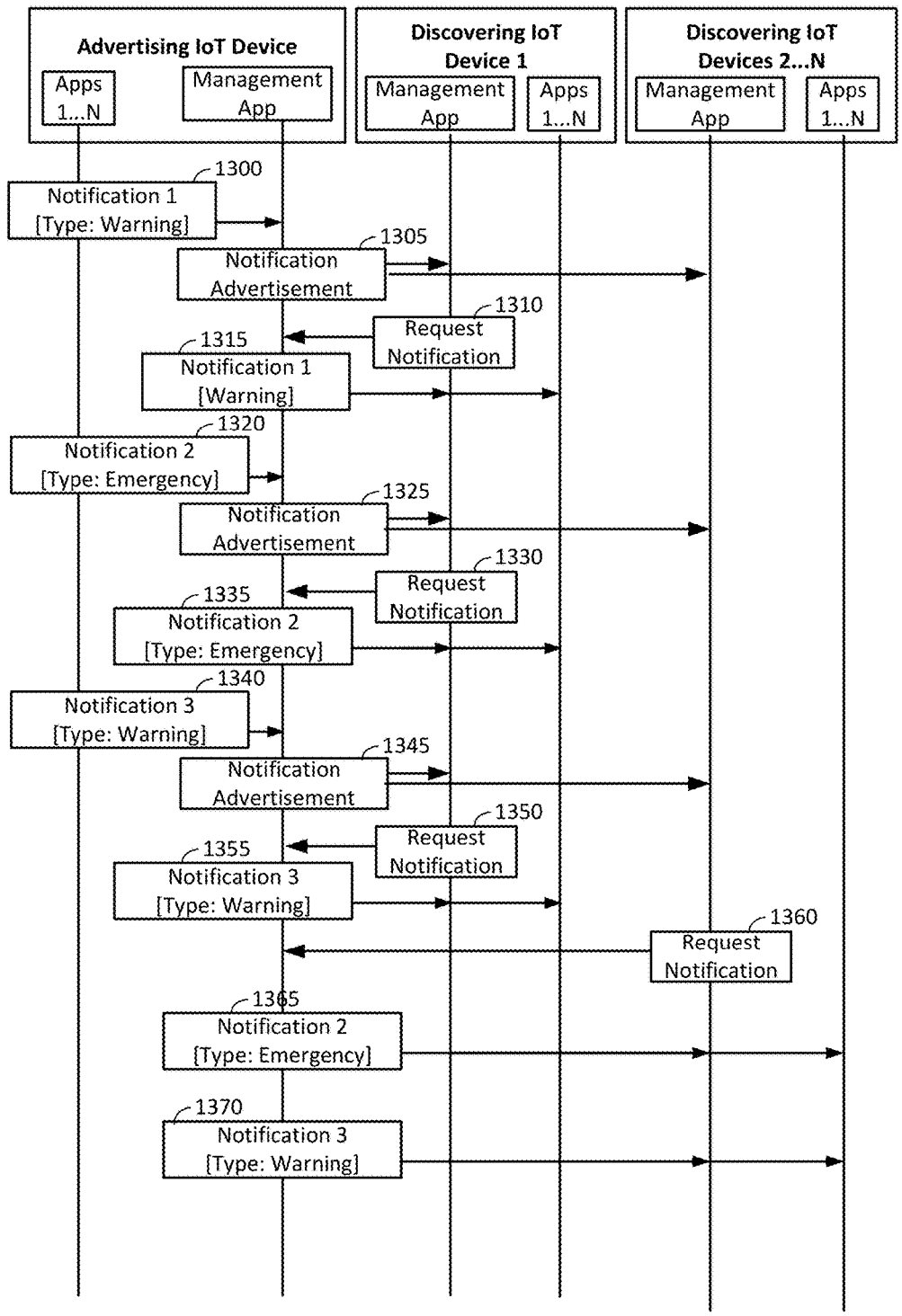
FIG. 13 illustrates another exemplary implementation of the process shown in FIG. 11 in accordance with an aspect of the disclosure.

FIG. 13 illustrates another example implementation of the process of FIG. 11 in accordance with an aspect of the disclosure. Referring to FIG. 13, an example is provided with respect to a series of notifications that have one of three types: emergency, warning or information. The process of FIG. 13 shows an example whereby the type of the notification message affects how the RDS protocol is implemented.

Referring to FIG. 13, a given application at the advertising IoT device requests that the advertiser management application transmit a first notification message with a "warning" type, 1300. The advertiser management application multicasts or broadcasts a notification advertisement, 1305, discovering IoT device 1 responds to the notification advertisement with a request for notification messages, 1310, and the advertiser management application provides the first notification message to discovering IoT device 1 via a unicast RDS which then presents the first notification message, 1315.

Next, the given application at the advertising IoT device requests that the advertiser management application transmit a second notification message with an "emergency" type, 1320. The advertiser management application multicasts or broadcasts a notification advertisement with an updated version number, 1325, discovering IoT device 1 responds to the notification advertisement with a request for notification messages, 1330, and the advertiser management application provides the second notification message to discovering IoT device 1 via a unicast RDS which then presents the second notification message, 1335. At this point, the advertising IoT device does not transmit the first notification message to discovering IoT device 1 again because the first notification was already transmitted to discovering IoT device 1 via unicast RDS at 1315 and the first notification message has not yet changed.

Next, the given application at the advertising IoT device requests that the advertiser management application transmit a third notification message with a "warning" type, 1340. The third notification message effectively overwrites the first notification because both notification messages have the same type and the third notification message is newer. The advertiser management application multicasts or broadcasts a notification advertisement with an updated version number, 1345, discovering IoT device 1 responds to the notification advertisement with a request for notification messages, 1350, and the advertiser management application provides the third notification message to discovering IoT device 1 via a unicast RDS which then presents the third notification message, 1355. At this point, the advertising IoT device does not transmit the first notification message to discovering IoT device 1 again because the first notification is overwritten (or replaced) by the third notification message. Also, the advertising IoT device does not transmit the second notification message to discovering IoT device 1 again because the second notification message was already transmitted to discovering IoT device 1 via unicast RDS at 1335 and the second notification message has not yet changed.

Further, discovering IoT devices 2 . . . N also respond to the notification advertisement from 1345 with requests for notification messages, 1360, and the advertiser management application provides the second and third notification messages to discovering IoT devices 2 . . . N via unicast RDSs for presentation thereon, 1365 and 1370. At this point, the advertising IoT device does not transmit the first notification message to discovering IoT devices 2 . . . N because the first notification is overwritten (or replaced) by the third notification message. As will be appreciated, RDS "overwriting" in occurs in FIG. 13 for unicast notification messages based on the type of notification, whereas RDS "overwriting" for multicast system-type messages (e.g., system service advertisements, notification advertisements, etc.) based on the associated version number.

Figure 14:
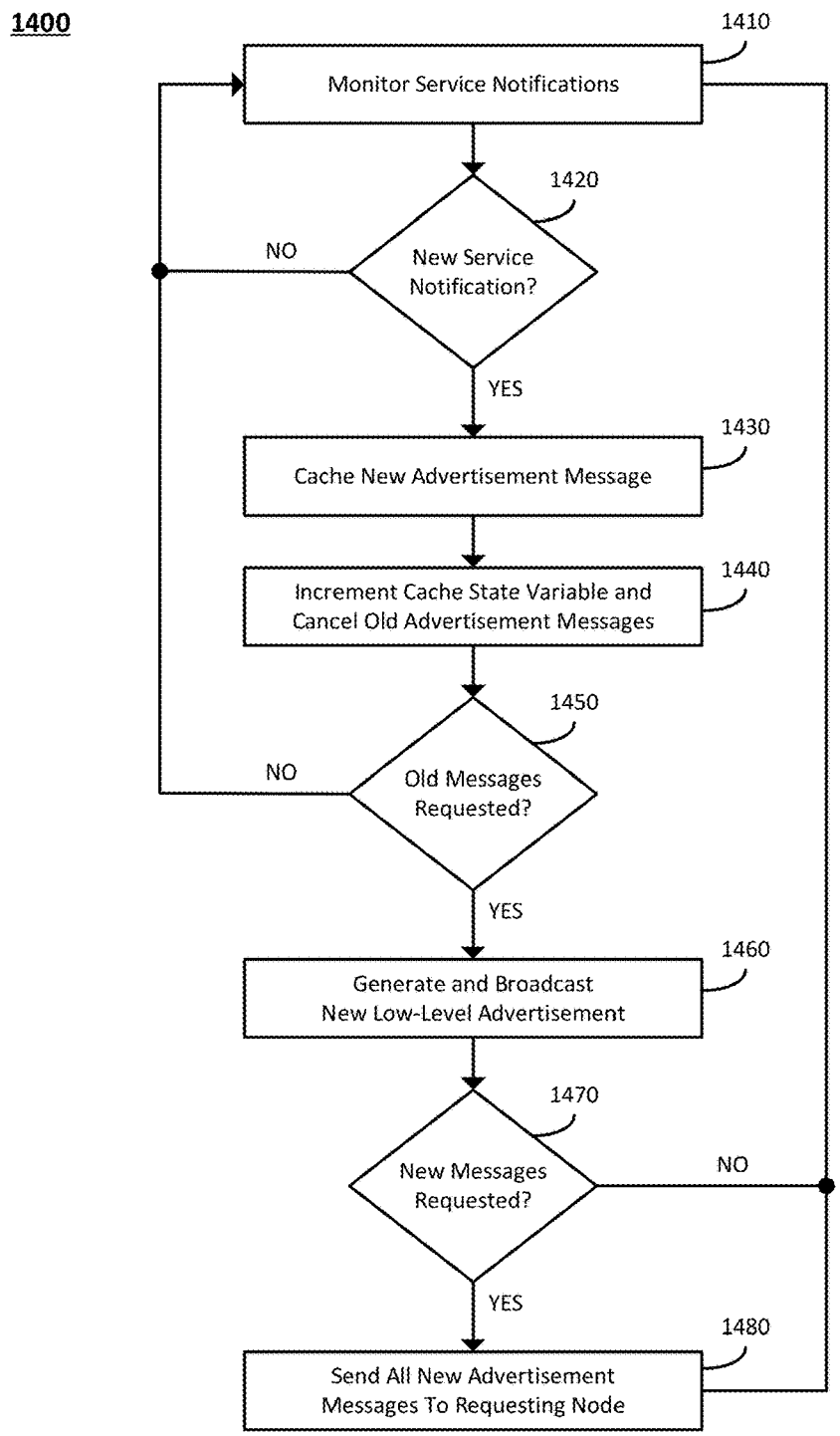
FIG. 14 illustrates an exemplary method that an advertising node may perform to convey state changes to a discovering node using connectionless messaging and a store-and-forward cache, in accordance with one aspect of the disclosure.
Figure 15:
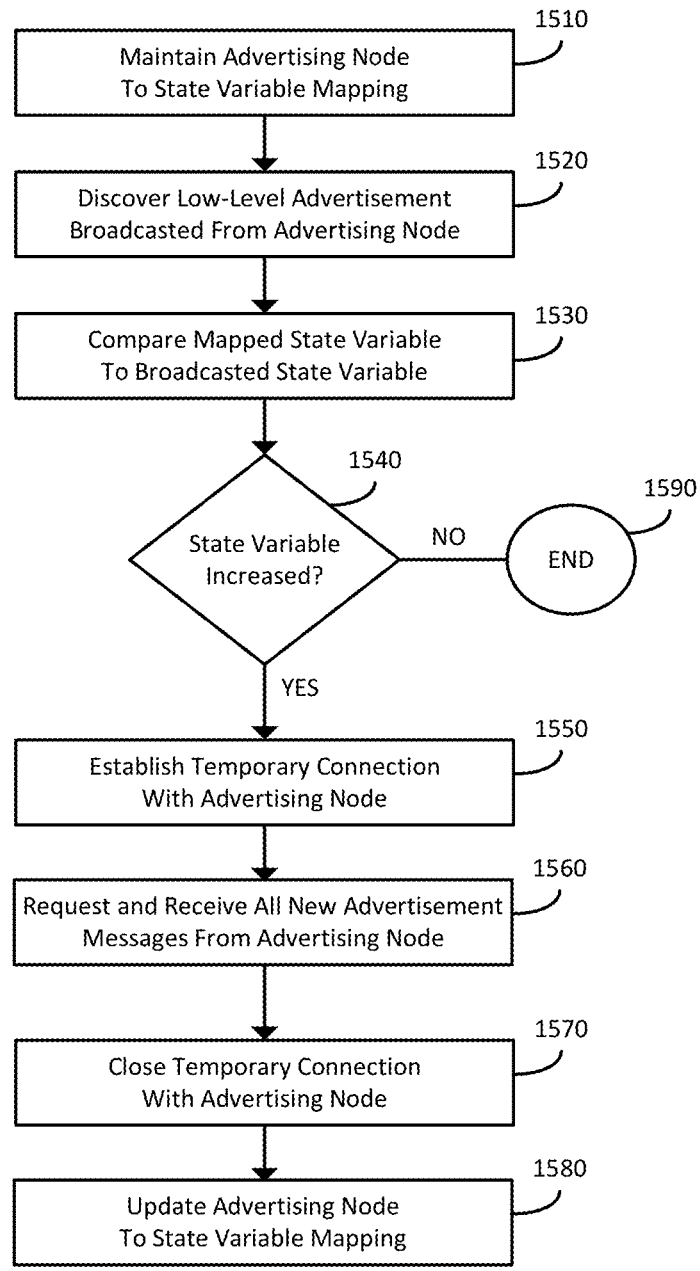
FIG. 15 illustrates an exemplary method that a discovering node may perform to receive state changes from an advertising node using connectionless messaging and a store-and-forward cache, in accordance with one aspect of the disclosure.

According to one aspect of the disclosure, FIG. 14 illustrates an exemplary method 1400 that an advertising node (also referred to as an advertising device) may perform to convey state changes associated with messages to a discovering node (also referred to as a discovering device) using connectionless messaging, and to send one or more of the messages (e.g., service-related messages) via a connection-oriented protocol. FIG. 15 illustrates an exemplary method that the discovering node may perform to receive the state changes and messages conveyed from the advertising node, and FIG. 16 is a block diagram depicting components of an advertising device 1600 and a discovering device 1602 that may be utilized in connection with the methods depicted in FIGS. 14 and 15.

In particular, the methods shown in FIG. 14 and FIG. 15 may enable the advertising device 1600 to share structured data with an unknown set of discovering devices in a manner that may remove bandwidth and/or size constraints that may be imposed on multicast/broadcast datagrams while still preserving benefits associated with multicast/broadcast datagrams (e.g., the ability to communicate over a network with a set of discovering nodes that are unknown to the advertising node). For example, in one embodiment, the connectionless messaging may generally employ a suitable broadcast/multicast discovery service 1604 such as the Multicast Domain Name System (mDNS), Bonjour, Universal Plug and Play (uPnP), AllJoyn, or another suitable broadcast/multicast discovery system. In some instances it is desirable to multicast a single datagram that is limited to Ethernet's (IEEE802.3) Maximum Transmission Unit (MTU) of 1500 bytes to avoid fragmentation of the UDP datagrams. As a consequence, a single datagram that is limited to 1500 bytes (or another appropriate limit) may be multicast from the advertising IoT device 1600 to a set of discovering nodes including the discovering IoT device 1602, wherein each discovering node independently uses the information in the size-limited datagram to determine whether or not the advertising IoT device 1600 is of interest to the respective discovering node.

As such, the methods shown in FIG. 14 and FIG. 15, and the advertising device 1600 and discovering device 1602, may build upon these basic discovery mechanisms to allow discovering nodes to efficiently receive data from an advertising node that is not limited in size or structure by a desire to avoid fragmentation or other network protocol specific limitations.

Figure 16:
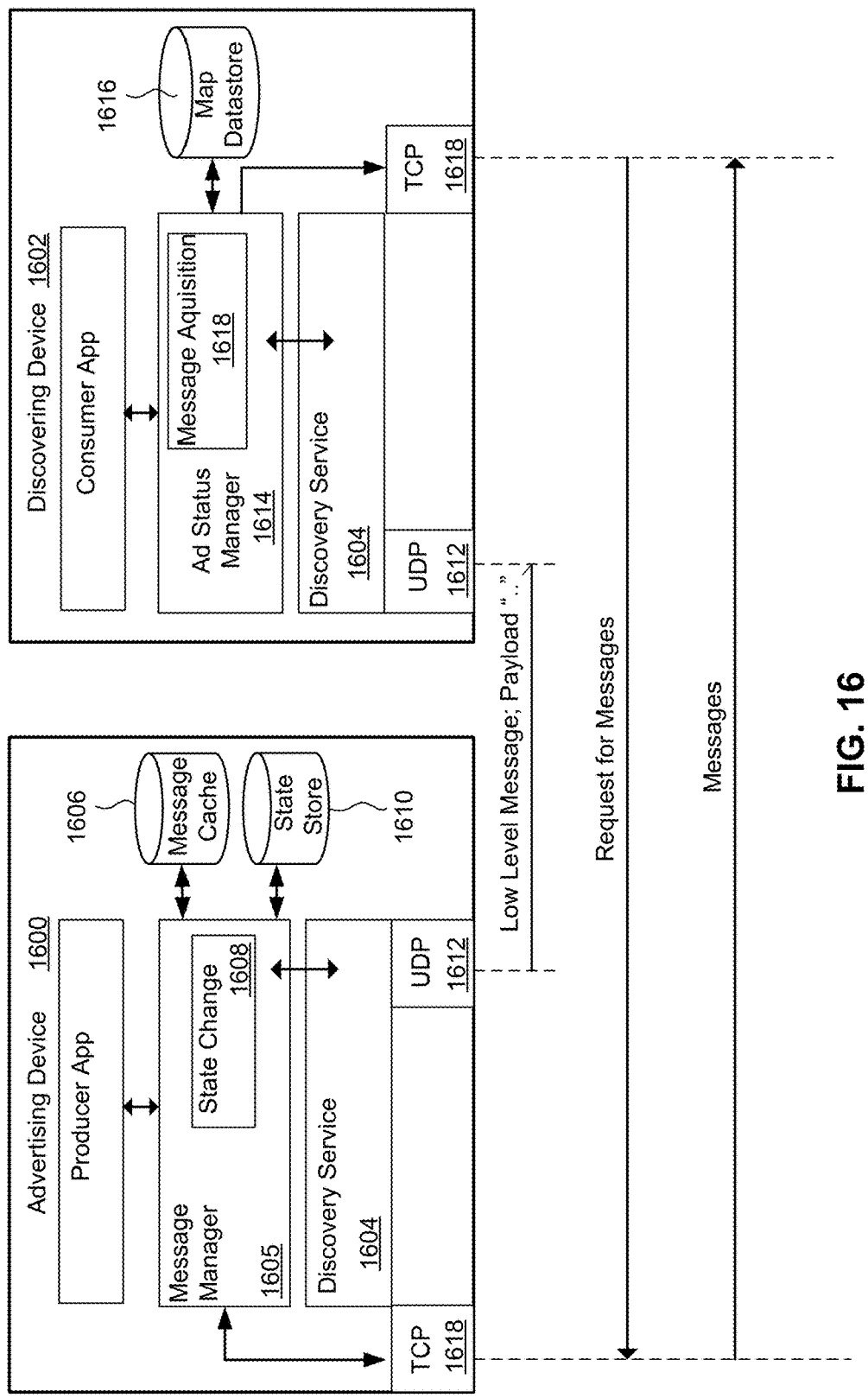
FIG. 16 is a block diagram depicting components of an advertising device and a discovering device that may be utilized in connection with the methods depicted in FIGS. 14 and 15.

For example, in the embodiment depicted in FIG. 16, the advertising device 1600 may include a message manager 1605 that stores all active advertisement messages in a message cache 1606 (also referred to as a local cache 1606) regardless of size until the advertising device 1600 cancels the active advertisement messages or the active advertisement messages otherwise expire. As shown, each time that the message manager 1605 of the advertising device 1600 adds a new message to the message cache 1606, a state change component 1608 of the advertising device 1600 may increment an internal state variable called "change_id" in a state store 1610 by one and may further cancel any old advertisements in the message cache 1606 that are associated with original change_id. In addition, each time that the advertising device 1600 increments the change_id state variable, the advertising device 1600 may determine whether at least one discovering node (e.g., the discovering device 1602) has requested advertisement messages up to and including the original change_id and thereby successfully acted on the original advertisements that were cancelled from message cache 1606. As such, in response to determining that one or more discovering nodes previously requested advertisement messages up to the original change_id, the message manager 1605 may prompt the discovery service 1604 to generate and broadcast a new low-level advertisement (e.g., a uPnP, Bonjour, mDNS AllJoyn, or other suitable advertisement) using a user datagram protocol (UDP) component 1612 having payload equal to the string ".." and the discovering nodes may receive the broadcasted low-level advertisement.

In one embodiment, the discovering device 1602 and other discovering nodes may include an ad status manager 1614 that maintains a map datastore 1616 that has a key corresponding to a device_id (e.g., a device identifier associated with the advertising device 1600 and other advertising nodes) and a change_id(Map) value. As such, each time that the discovering device 1602 receives a new low-level advertisement broadcasted from an advertising node, the ad status manager 1614 may compare the change_id in the broadcasted advertisement with the change_id(Map) in the map datastore 1616 mapping associated with the advertising node. As depicted, if the advertised change_id associated with the advertising node exceeds the stored change_id (Map) associated with the device_id that corresponds to the advertising node, a message acquisition component 1618 establishes a temporary connection with the advertising node. For example, the temporary connection may be comprise a temporary connection-oriented connection such as a TCP connection established via TCP components 1618 on the discovering IoT device and the advertising IoT device 1600. In the alternative, the temporary connection may be made using a reliable UDP-based transport connection that may support message manager 1605 to ad status manager 1614 communication, or a connection according to any other suitable protocol that may be used to reliably transport messages between the discovering device 1602 and the advertising device 1600. In any case, in response to establishing the temporary connection with the message manager 1605 of the advertising device 1600, the message acquisition component 1618 may request that the message manager 1605 send all messages in the message cache 1606 having a change_id between the change_id(Map) and the advertised change_id and the temporary connection may then be closed after the message manager 1605 has sent all of the messages in the message cache 1606 that fall within that range. Thereafter, the ad status manager 1614 may update the change_id(Map) associated with the advertising device 1600 with the change_id included in the last advertisement message that the advertising device 1600 sent to the discovering device 1602. In some embodiments, if no discovering nodes have previously requested advertisement messages up to the original change_id, the message manager 1605 may not generate the low-level advertisement, and as a consequence, the advertising node does not blindly update the low-level advertisement whenever the change_id has been incremented and the multicast traffic that occurs when the advertising node rapidly adds or replaces messages to modify the store-and-forward cache may be substantially reduced.

Referring again to FIG. 14, the method 1400 that the advertising device performs to convey state changes to one or more (potentially unknown) discovering nodes (e.g., the discovering device 1602) may initially include monitoring one or more services at block 1410 in a substantially continuous manner until detecting that a new service notification has become available at block 1420. In response to detecting a new service notification (e.g., from a producer app) at block 1420, the message manager 1605 may then store a new message corresponding thereto in the message cache 1606 at block 1430. In addition, the state change component 1608 may increment the internal "change_id" state variable and cancel any old advertisements in the message cache 1606 that are associated with original change_id at block 1440. In one embodiment, the message manager 1605 may then determine whether at least one discovering node has requested advertisement messages up to and including the original change_id at block 1450 and return to block 1410 to continue monitoring the one or more services if no discovering nodes have previously requested advertisement messages up to the original change_id. As such, if no discovering nodes previously requested advertisement messages up to the original change_id, the message manager 1605 may take no further action with respect to the new message added to the message cache 1606 and thereby substantially reduce the multicast traffic that may otherwise occur when rapidly modifying the message cache 1606 in the absence of any discovering nodes having requested advertisements relating to the monitored services.

Otherwise, in response to the message manager 1605 determining that one or more discovering nodes previously requested advertisement messages up to the original change_id, the message manager 1605 may then generate and broadcast (e.g., via the UDP component 1612) a new low-level advertisement having payload equal to the string ".." at block 1460. In one embodiment, at block 1470, the message manager 1605 may then determine whether any discovering nodes established a temporary connection (e.g., via the TCP component 1618) to request that the message manager 1605 send all messages in the message cache 1606 having a change_id between a change_id(Map) maintained at the discovering nodes and the advertised change_id. If the message manager 1605 does not receive such a request from one or more discovering nodes, the message manager 1605 may return to block 1410 to continue monitoring the one or more services. Otherwise, in response to receiving such a request from one or more discovering nodes, the message manager 1605 may identify the current change_id(Map) at the discovering node from the request and send all messages in the message cache 1606 having a change_id between the current change_id(Map) at the discovering node and the advertised change_id at block 1480 prior to returning to block 1410 to continue monitoring the one or more services.

Referring now to FIG. 15, the method 1500 that the ad status manager 1614 performs to receive the state changes conveyed from the advertising IoT device 1600 (and other advertising nodes) may include the ad status manager 1614 maintaining a mapping between the advertising IoT device and the change_id state variable at block 1510. For example, as noted above, the mapping may be maintained in the map datastore 1616 and may include a device_id key that corresponds to a particular advertising node and a change_id (Map) value that represents the last known change_id associated with the message cache 1606 at the advertising IoT device 1600. As such, in response to the message manager 1605 adding a new message to the message cache 1606 and broadcasting the new low-level advertisement having the ".." payload and information indicating the current value associated with the change_id state variable at the advertising IoT device 1600, the discovering IoT device 1602 may receive the broadcasted low-level advertisement at block 1520 (e.g., via the UDP component 1612). The ad status manager 1614 may then compare the change_id in the broadcasted advertisement with the change_id(Map) mapped to the advertising IoT device 1600 at block 1530 and determine whether the advertised change_id exceeds the local change_id(Map) mapped to the advertising IoT device 1600 at block 1540. In one embodiment, if the ad status manager 1614 determines that the advertised change_id does not exceed the local change_id(Map) mapped to the advertising IoT device 1600, the method 1500 may be terminated at block 1590 on the assumption that the discovering IoT device 1602 has received all relevant advertisements up to and including the advertisements associated with the current change_id at the advertising node. Otherwise, if the ad status manager 1614 determines that the advertised change_id exceeds the local change_id(Map), the ad status manager 1614 may establish a temporary connection with the advertising node at block 1550, wherein all messages in the message cache 1606 having a change_id between the change_id(Map) and the advertised change_id may be requested and received from the advertising node over the temporary connection at block 1560. The discovering device 1602 may then close the temporary connection at block 1570 after the advertising IoT device 1600 has sent all of the messages in the message cache 1606 that fall within the applicable range and update the change_id(Map) associated with the advertising node at block 1580, wherein the mapping may be updated according to the change_id included in the last advertisement message that the advertising device 1600 sent to the discovering device 1602.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for sending messages from an advertising device to a discovering device, the method comprising:
   storing, at the advertising device, a plurality of messages in a local cache;
   incrementing, each time a message is added to the local cache, a value of an internal state variable stored on the advertising device to associate each value of the internal state variable with a corresponding one of the plurality of messages;
   broadcasting, in response to a new message being added to the local cache, a low-level advertisement, wherein the low-level advertisement includes an identifier of the advertising device and a new value of the internal state variable associated with the new message;
   receiving, from a discovering device, a request for the new message in the local cache associated with the new value of the internal state variable; and
   unicasting in response to the request, the new message to the discovering device.

2. The method of claim 1, wherein the advertising device does not broadcast the new low-level advertisement in response to determining that no requests from the discovering device were received prior to incrementing the value of the internal state variable to the new value.

3. The method of claim 1, further comprising:
   broadcasting the low-level advertisement in response to determining that at least one request from the discovering device was received prior to incrementing the value of the internal state variable to the new value.

4. The method of claim 3, wherein the broadcasted low-level advertisement indicates that the internal state variable was incremented and that the low-level advertisement has a payload size smaller than the new message added to the local cache.

5. The method of claim 3, wherein the discovering device maintains a mapping between an identifier associated with the advertising device and a local value that corresponds to the internal state variable associated with the messages stored in the local cache at the advertising device.

6. The method of claim 5, wherein the discovering device requests the new message added to the local cache from the advertising device when the new value associated with the internal state variable in the broadcasted low-level advertisement exceeds the local value mapped to the identifier of the advertising device.

7. The method of claim 6, wherein the discovering device establishes a temporary connection with the advertising device to request the new message added to the local cache from the advertising device.

8. The method of claim 7, wherein the established temporary connection is closed after the advertising device sends the new message to the at least one discovering device, and wherein the at least one discovering device updates the local value mapped to the identifier associated with the advertising device based on the new value associated with the internal state variable in the broadcasted low-level advertisement in response to receiving the new message transmitted from the advertising device.

9. An advertising device comprising:
at least one producer app that generates service-related messages;
a first transceiver configured to communicate via a wireless air interface;
a second transceiver configured to communicate via the wireless air interface;
a discovery service component configured to broadcast low-level advertisements via the first transceiver;
a local cache to store the service-related messages;
a message manager to:
store the service-related messages in the local cache;
increment, each time a message is added to the local cache, a value of an internal state variable stored on the advertising device to associate each value of the internal state variable with a corresponding one of the plurality of messages;
prompt the discovery service to broadcast, in response to a new message being added to the local cache, a low-level advertisement via the first transceiver, wherein the low-level advertisement includes an identifier of the advertising device and a new value of the internal state variable associated with the new message;
receive, from a discovering device, a request for the new message in the local cache associated with the new value of the internal state variable; and
unicast, via the second transceiver, in response to the request, the new message to the discovering device.

10. The advertising device of claim 9, wherein the low-level advertisement is sent via user datagram protocol and the new message is unicast via transmission control protocol.

11. The advertising device of claim 9, wherein the discovery service component is configured to broadcast low-level advertisements that are limited to 1500 bytes, and the message manager is configured to unicast messages that are greater than 1500 bytes.

12. A non-transitory, tangible processor readable storage medium, encoded with processor readable instructions to perform a method for sending messages from an advertising device to a discovering device, the method comprising:
storing, at the advertising device, a plurality of messages in a local cache;
incrementing, each time a message is added to the local cache, a value of an internal state variable stored on the advertising device to associate each value of the internal state variable with a corresponding one of the plurality of messages;
broadcasting, in response to a new message being added to the local cache, a low-level advertisement, wherein the low-level advertisement includes an identifier of the advertising device and a new value of the internal state variable associated with the new message;
receiving, from a discovering device, a request for the new message in the local cache associated with the new value of the internal state variable; and
unicasting in response to the request, the new message to the discovering device.

13. The non-transitory, tangible processor readable storage medium of claim 12, wherein the advertising device does not broadcast the new low-level advertisement in response to determining that no requests from the discovering device were received prior to incrementing the value of the internal state variable to the new value.

14. The non-transitory, tangible processor readable storage medium of claim 12, the method comprising:
broadcasting the low-level advertisement in response to determining that at least one request from the discovering device was received prior to incrementing the value of the internal state variable to the new value.

15. The non-transitory, tangible processor readable storage medium of claim 14, wherein the broadcasted low-level advertisement indicates that the internal state variable was incremented and that the low-level advertisement has a payload size smaller than the new message added to the local cache.

16. The non-transitory, tangible processor readable storage medium of claim 14, wherein the discovering device maintains a mapping between an identifier associated with the advertising device and a local value that corresponds to the internal state variable associated with the messages stored in the local cache at the advertising device.

17. The non-transitory, tangible processor readable storage medium of claim 16, wherein the discovering device requests the new message added to the local cache from the advertising device when the new value associated with the internal state variable in the broadcasted low-level advertisement exceeds the local value mapped to the identifier of the advertising device.

18. The non-transitory, tangible processor readable storage medium of claim 17, wherein the discovering device establishes a temporary connection with the advertising device to request the new message added to the local cache from the advertising device.

19. The non-transitory, tangible processor readable storage medium of claim 18, wherein the established temporary connection is closed after the advertising device sends the new message to the at least one discovering device, and wherein the at least one discovering device updates the local value mapped to the identifier associated with the advertising device based on the value associated with the internal state variable in the broadcasted low-level advertisement in response to receiving the new message transmitted from the advertising device.

* * * * *